United States Patent
Ge et al.

(10) Patent No.: US 8,571,545 B2
(45) Date of Patent: *Oct. 29, 2013

(54) SHORT-RANGE WIRELESS RELAY METHOD AND SYSTEM

(75) Inventors: Ning Ge, Beijing (CN); Yi Zhang, Beijing (CN); Zhiwei Meng, Beijing (CN)

(73) Assignee: Shenzhen Cloud Communication Epoch Sci-Tech Ltd, Shenzhen (CN)

( * ) Notice: Subject to any disclaimer, the term of this patent is extended or adjusted under 35 U.S.C. 154(b) by 466 days.

This patent is subject to a terminal disclaimer.

(21) Appl. No.: 13/005,506

(22) Filed: Jan. 12, 2011

(65) Prior Publication Data

US 2012/0165026 A1 Jun. 28, 2012

(30) Foreign Application Priority Data

Dec. 22, 2010 (CN) .......................... 2010 1 0602104

(51) Int. Cl.
H04W 4/00 (2009.01)
(52) U.S. Cl.
USPC ........ 455/426.1; 455/522; 455/523; 370/315; 370/252; 370/350; 375/272
(58) Field of Classification Search
USPC ..................................... 455/426.2
See application file for complete search history.

(56) References Cited

U.S. PATENT DOCUMENTS

| 5,974,092 A * | 10/1999 | Roos et al. ............... 375/272 |
| 6,463,477 B1 * | 10/2002 | Fontenot .................. 709/236 |
| 2005/0261018 A1 * | 11/2005 | Yamamoto ............... 455/522 |
| 2009/0003307 A1 * | 1/2009 | Yang et al. ............... 370/350 |
| 2010/0083127 A1 * | 4/2010 | Rofougaran ............. 715/740 |
| 2010/0234051 A1 | 9/2010 | Holden et al. |
| 2011/0021189 A1 * | 1/2011 | Tischer et al. ........... 455/426.2 |
| 2011/0205955 A1 * | 8/2011 | Xu et al. .................. 370/315 |
| 2011/0294500 A1 * | 12/2011 | Chang et al. ............ 455/426.1 |
| 2012/0176927 A1 * | 7/2012 | Takano .................... 370/252 |

OTHER PUBLICATIONS

Cordless Telephony Profile, Bluetooth Specification Version 1.1, Part K:3 (Feb. 22, 2001).

* cited by examiner

Primary Examiner — Charles Appiah
Assistant Examiner — Randy Peaches
(74) Attorney, Agent, or Firm — Anova Law Group, PLLC

(57) ABSTRACT

A wireless relay apparatus is provided. The wireless relay apparatus includes a telephone module configured to couple with a public switched telephone network (PSTN) to receive a telephone call, and a wireless module coupled to the telephone module to process the telephone call and configured to wirelessly connect to a mobile terminal such that the telephone call is forwarded to the mobile terminal over a short-range wireless link. Further, the wireless module is configured to operate in one of a transparent mode and a translation mode so as to exchange voice data with the mobile terminal.

22 Claims, 20 Drawing Sheets

FIG. 19

| Sub-Type | Request Header | Usage |
|---|---|---|
| SIM Card | ATPQ_SIM | SIM card visit/modify, including phone book, SIM card short message, PIN, PUK, and other SIM tool kit (STK) operations |
| Call | ATPQ_CAL | Calls and call-related configurations |
| SMS | ATPQ_SMS | Short message service (SMS) and USSD reception and transmission and related configurations |
| Registration | ATPQ_REG | Communication network registration, search, setup, and device information |
| Others | ATPQ_MIS | Miscellaneous commands |
| Extension | ATPQ_VEN | Vendor defined |

FIG. 9

| Sub-Type | Response Header | Usage |
|---|---|---|
| General Response | ATPR_GEN | General response commands |
| SIM Card | ATPR_SIM | Response to ATPQ_SIM |
| Call | ATPR_CAL | Response to ATPQ_CAL |
| SMS | ATPR_SMS | Response to ATPQ_SMS |
| Registration | ATPR_REG | Response to ATPQ_REG |
| Others | ATPR_MIS | Response to ATPQ_MIS |
| Extension | ATPR_VEN | Response to ATPQ_VEN |

FIG. 10

| Sub-Type | Response Header | Usage |
|---|---|---|
| SIM Card | ATPU_SIM | SIM card status change and other STK related changes |
| Call | ATPU_CAL | Dialed, activated, and incoming calls, etc. |
| SMS | ATPU_SMS | Incoming short message |
| Registration | ATPU_REG | Mobile and network update |
| Others | ATPU_MIS | Micellaneous |
| Extension | ATPU_VEN | Vendor defined |

FIG. 11

SHORT-RANGE WIRELESS RELAY METHOD AND SYSTEM

CROSS-REFERENCES TO RELATED APPLICATIONS

This application claims the priority of Chinese patent application number 201010602104.1, filed on Dec. 22, 2010, the entire contents of which are incorporated herein by reference.

FIELD OF THE INVENTION

The present invention generally relates to wireless communication technologies and, more particularly, to the methods and systems relaying communication using short-range wireless techniques.

BACKGROUND

The quality for indoor cellular communication is often poor due to signal attenuation by building walls and windows. Common solutions include increasing the outdoor base station output power in the downlink and increasing the number of base stations, or increasing output power of mobile terminals. However, these methods increase radiation and cause electromagnetic pollution.

Other solutions such as Femtocell have also been developed. A Femtocell is a small cellular base station typically designed for use in a home or small business. The Femtocell communicates with mobile terminals over the same cellular bandwidth on one side and communicates to operator's networks through land-line broadband IP connections on the other side. However, Femtocell base stations are often complex, difficult to manage, and expensive, and are also often not portable.

The disclosed methods and systems are directed to solve one or more problems set forth above and other problems.

BRIEF SUMMARY OF THE DISCLOSURE

One aspect of the present disclosure includes a wireless relay apparatus. The wireless relay apparatus includes a telephone module configured to couple with a public switched telephone network (PSTN) to receive a telephone call, and a wireless module coupled to the telephone module to process the telephone call and configured to wirelessly connect to a mobile terminal such that the telephone call is forwarded to the mobile terminal over a short-range wireless link. Further, the wireless module is configured to operate in one of a transparent mode and a translation mode so as to exchange voice data with the mobile terminal.

Another aspect of the present disclosure includes a mobile wireless terminal. The mobile wireless terminal includes a wireless unit, an audio codec, and a processor unit. The wireless unit is configured to connect to a wireless relay over a short-range wireless link for receiving a telephone call forwarded by the wireless relay coupled between the mobile wireless terminal and a public switched telephone network (PSTN), and the telephone call is originated from the PSTN. Further, the audio codec is configured to process voice signals corresponding to the telephone call. The processor unit is coupled to the wireless unit to process the telephone call such that the telephone call is answered by the mobile wireless terminal, and is configured to support one of a transparent mode and a translation mode so as to exchange voice data with the wireless relay.

Another aspect of the present disclosure includes a method for a wireless communication system. The wireless communication system includes a mobile terminal and a wireless relay, and the wireless relay is coupled between the mobile terminal and a public switched telephone network (PSTN). The method includes the mobile terminal discovering the wireless relay, and connecting to the wireless relay after the wireless relay is discovered. The method also includes the wireless relay registering the mobile terminal after receiving a register request from the mobile terminal based on a database containing registration information of a plurality of mobile terminals. Further, the method includes the mobile terminal initiating a telephone call to the PSTN via the wireless relay. The mobile terminal and the wireless relay exchange voice data corresponding to the telephone call over a short-range wireless link based on one of a transparent mode and a translation mode.

Another aspect of the present disclosure includes a wireless communication system. The wireless communication system includes a wireless relay and a mobile terminal. The wireless relay is coupled to a public switched telephone network (PSTN). The mobile terminal is configured to discover the wireless relay and to initiate a telephone call to the PSTN via the wireless relay. The mobile terminal is further configured to connect to the wireless relay after the wireless relay is discovered; and the wireless relay is further configured to register the mobile terminal after receiving a register request from the mobile terminal based on a database containing registration information of a plurality of mobile terminals. In addition, the mobile terminal and the wireless relay exchange voice data corresponding to the telephone call over a short-range wireless link based on one of a transparent mode and a translation mode.

Other aspects of the present disclosure can be understood by those skilled in the art in light of the description, the claims, and the drawings of the present disclosure.

BRIEF DESCRIPTION OF THE DRAWINGS

FIG. 9 illustrates exemplary ATP commands for ATP requests consistent with the disclosed embodiments;

FIG. 10 illustrates exemplary ATP commands for normal ATP responses consistent with the disclosed embodiments;

FIG. 11 illustrates exemplary ATP commands for unsolicited ATP responses consistent with the disclosed embodiments;

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
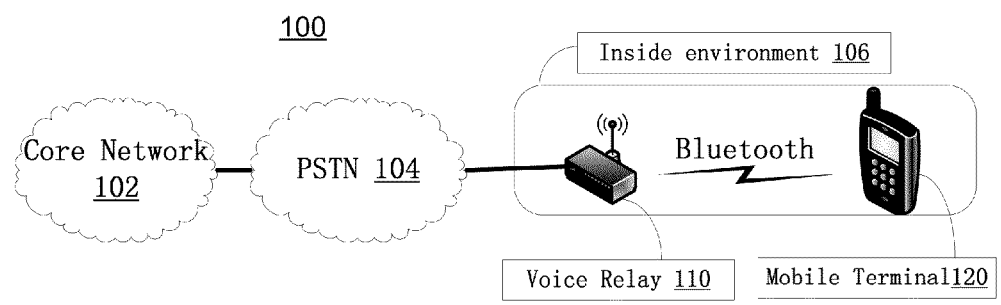
FIG. 1 illustrates an exemplary communication environment consistent with the disclosed embodiments.

FIG. 1 shows an exemplary communication environment 100 incorporating certain aspects of the disclosed embodiments. As shown in FIG. 1, communication environment 100 includes a core network 102, a public switched telephone network (PSTN) 104, a voice relay 110, and a mobile terminal 120. Voice relay 110 and mobile terminal 120 may be referred to as inside environment 106. The type and number of components are shown for illustrative purposes. Any number of listed components may be used and other components may also be included.

Core network 102 may be managed by a network operator to administer network operations for both data and voice. Core network 102 may interface with multiple access networks to connect a call request or data request from one access network to another access network, and to receive uplink signals from access networks and to generate downlink signals to access networks.

PSTN 104 may include any appropriate telephone network providing landline-based communication or any appropriate fixed telephone network. PSTN 104 may receive uplink signals from voice relay 110 and mobile terminal 120 and forward the uplink signals to core network 102 and a corresponding access network. PSTN 104 may also receive downlink signals for voice relay 110 and mobile terminal 120 from core network 102 and forward the downlink signals to voice relay 110 and mobile terminal 120.

Further, inside environment 106 may refer to any appropriate small or short-range wireless network inside a house or a building for providing improved wireless communications. Voice relay 110 and mobile terminal 120 may communicate with each other over a short-range wireless link, such as a Bluetooth communication link. Other wireless link may also be used. A short-range wireless may refer to a wireless technology used in a place close to a user, such as a home, a small office, or a building. For example, a Bluetooth wireless may be used in a 10 m or 100 m range. Short-range wireless may also include wireless links based on a short-range suitable wireless spectrum, such as based on the industrial, scientific, and medical (ISM) radio bands. Voice relay 110 performs certain receiving and sending functions for mobile terminal 120 such that radiation from antennas of mobile terminal 120 may be substantially reduced. Because voice relay 110 connects mobile terminal 120 over a wireless link, voice relay 110 may also be considered as a wireless relay. A wireless relay may include not only voice communication but also other types of communications, such as text, video, or multimedia. Further, voice relay 110 and mobile terminal 120 may be treated as a wireless communication system.

Figure 2A:
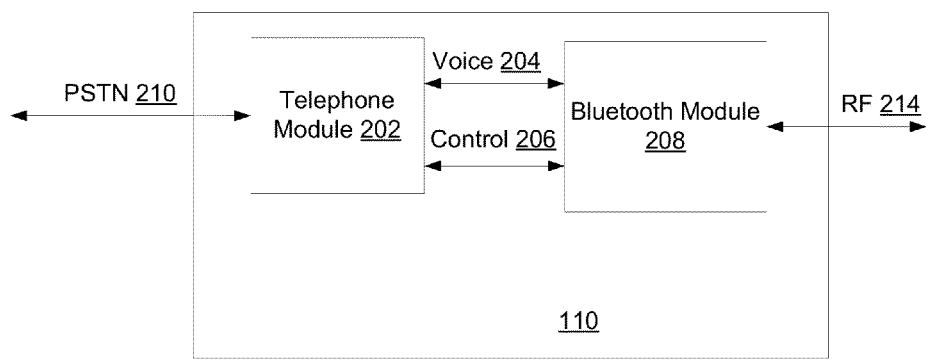
FIG. 2A illustrates a block diagram of an exemplary voice relay consistent with the disclosed embodiments.

FIG. 2A illustrates a block diagram of an exemplary voice relay 110. As shown in FIG. 2A, voice relay 110 may include a telephone module 202, a voice interface 204, a control interface 206, a Bluetooth module 208, a PSTN interface 210, and a radio frequency (RF) interface 214. In certain embodiments, optionally, a separate processor (not shown) may also be provided to control voice relay 110, or the functionalities of the separate processor may be incorporated into telephone module 202 and/or Bluetooth module 208.

Telephone module 202 may include any appropriate components configured to communicate with a telephone network, such as PSTN network 104. Telephone module 202 may communicate with PSTN network 104 through PSTN interface 210, receiving communication signals from PSTN network 104 and sending communication signals to PSTN network 104.

Bluetooth module 208 is coupled between telephone module 202 and mobile terminal 120 to receive voice and control data from telephone module 202 and mobile terminal 120 and to send voice and control data to telephone module 202 and mobile terminal 120. For example, Bluetooth module 208 may receive voice and control data from mobile terminal 120 via RF interface 214 according to Bluetooth communication standards, and may translate the received voice and control data into communication signals supported by telephone module 202. Similarly, Bluetooth module 208 may receive voice and control data from telephone module 202 via voice interface 204 and control interface 206, respectively, and may translate the received voice and control data into Bluetooth standards for mobile terminal 120.

Figure 2B:
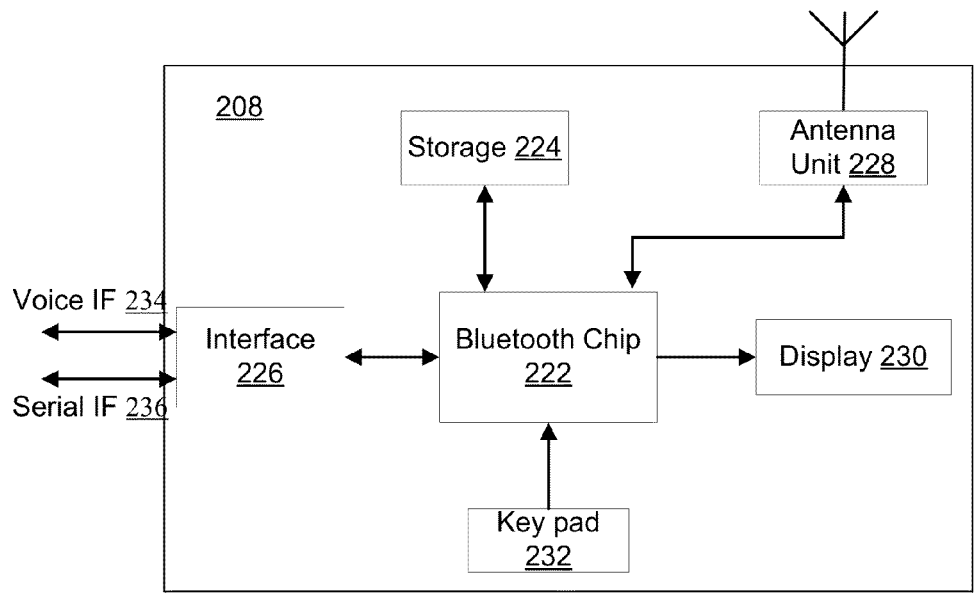
FIG. 2B illustrates a block diagram of an exemplary Bluetooth module consistent with the disclosed embodiments.

FIG. 2B shows a block diagram of an exemplary Bluetooth module 208. As shown in FIG. 2B, Bluetooth module 208 includes a Bluetooth chip 222, a storage 224, an interface 226, an antenna unit 228, a display 230, a key pad 232, a voice interface 234, such as a pulse code modulation (PCM) interface, and a serial interface 236, such as a universal asynchronous receiver/transmitter (UART) interface.

Bluetooth chip 222 may include any appropriate single-chip or micro-control unit capable of handling RF processing, baseband processing, and Bluetooth protocol processing to enable Bluetooth communication between voice relay 110 and mobile terminal 120. Storage 224 may include any appropriate device, such as a flash memory device, for storing computer programs and database information. Further, interface 226 may include any appropriate interface devices such as a UART serial port and a PCM bus. Bluetooth module 208 may communicate with telephone module 202 via interface 226 using Voice interface 234 and/or Serial interface 236. Other interfaces or devices may also be used.

Key pad 232 may include any appropriate type of key pad for a user to configure voice relay 110 and to input certain information into voice relay 110. Display 230 may include any appropriate device, such as an LED indicator or an LCD display device, to display or indicate information to the user.

Figure 2C:
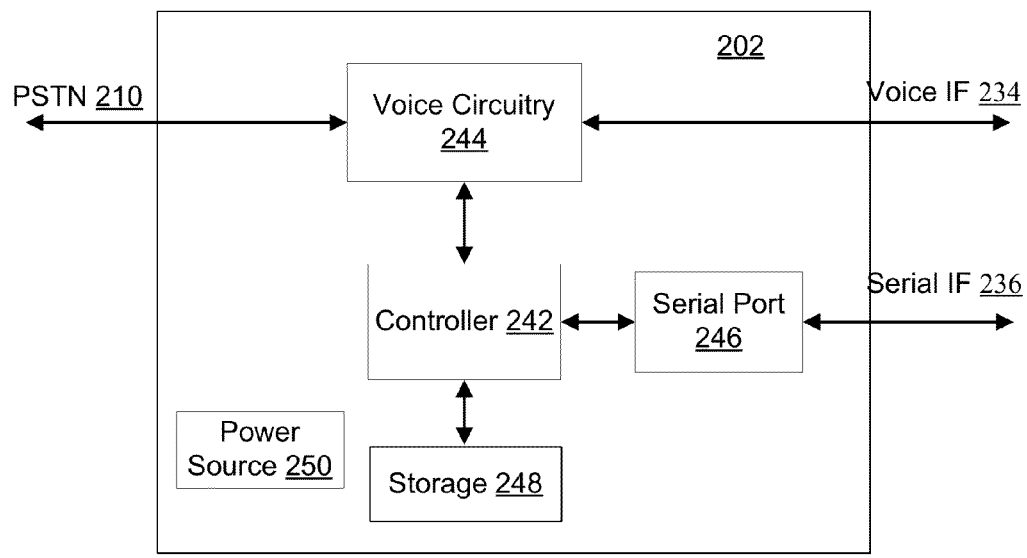
FIG. 2C illustrates a block diagram of an exemplary telephone module consistent with the disclosed embodiments.

FIG. 2C shows a block diagram of an exemplary telephone module 202. As shown in FIG. 2C, telephone module 202 includes a voice circuitry 244, a controller 242, a storage 248, a voice interface 234, a serial port 246, a PSTN interface 210, and a power source 250. Power source 250 may include any appropriate voltage(s) for providing power to telephone module 202 and optionally to voice relay 110. Although power source 250 as shown is placed in telephone module 202, power source 250 may be placed in Bluetooth module 208 or voice relay 110.

Controller 242 may include any appropriate controller for providing control functionalities of telephone module 202. Storage 248 may include any appropriate device similar to storage 224, and may coincide with storage 224, for storing computer programs and other information. Voice circuitry 244 may include any appropriate circuitry implementing receiving incoming calls and initiating outgoing calls through PSTN interface 210, and providing bi-directional PCM data flow to/from Bluetooth module 208 through Voice interface 234, etc. Further, serial port 246 may be provided in telephone module 202 to communicate with Bluetooth module 208 via Serial interface 236.

Figure 3:
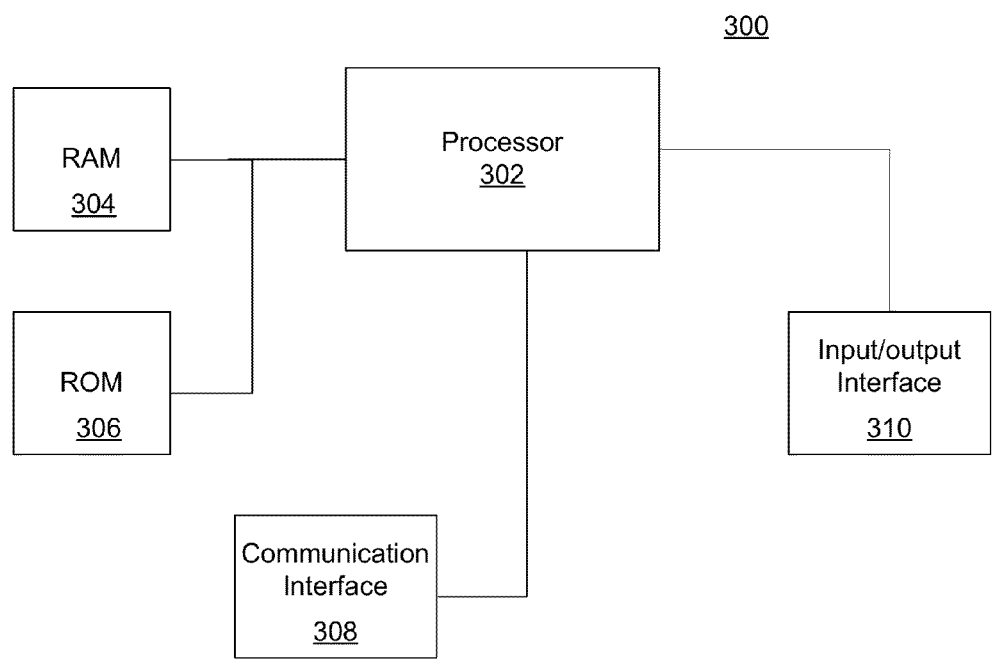
FIG. 3 illustrates an exemplary computing system consistent with the disclosed embodiments.

Various control modules, such as Bluetooth chip 222, controller 242, and similar control modules in mobile terminal 120, may be implemented in any appropriate computing hardware and/or software. FIG. 3 shows an exemplary computing system 300 for implementing the various control modules.

As shown in FIG. 3, computing system 300 may include a processor 302, a random access memory (RAM) unit 304, a read-only memory (ROM) unit 306, a communication interface 308, and an input/output interface unit 310. Other components may be added and certain devices may be removed.

Processor 302 may include any appropriate type of graphic processing unit (GPU), general-purpose microprocessor, digital signal processor (DSP) or microcontroller, and application specific integrated circuit (ASIC), etc. Processor 302 may also include processing unit for providing particular functions depending on particular applications. Further, processor 302 may execute sequences of computer program instructions to perform various processes associated with computing system 300. The computer program instructions may be loaded into RAM 304 for execution by processor 302 from read-only memory 306.

Communication interface 308 may provide communication connections such that computing system 300 may be accessed remotely and/or communicate with other systems through computer networks or other communication networks via various communication protocols, such as transmission control protocol/internet protocol (TCP/IP), hyper text transfer protocol (HTTP), etc.

Input/output interface 310 may be provided for users to input information into computing system 300 or for the users to receive information from computing system 300. For example, input/output interface 310 may include any appropriate input device, such as a remote control, a keyboard, a mouse, an electronic tablet, voice communication devices, or any other optical or wireless input devices. Input/output interface 310 may also include any appropriate output device, such as a display screen for displaying certain information to the user, a speaker to play ringtone or other voice notices to the user, or other types of indicators (e.g., LEDs).

Figure 4:
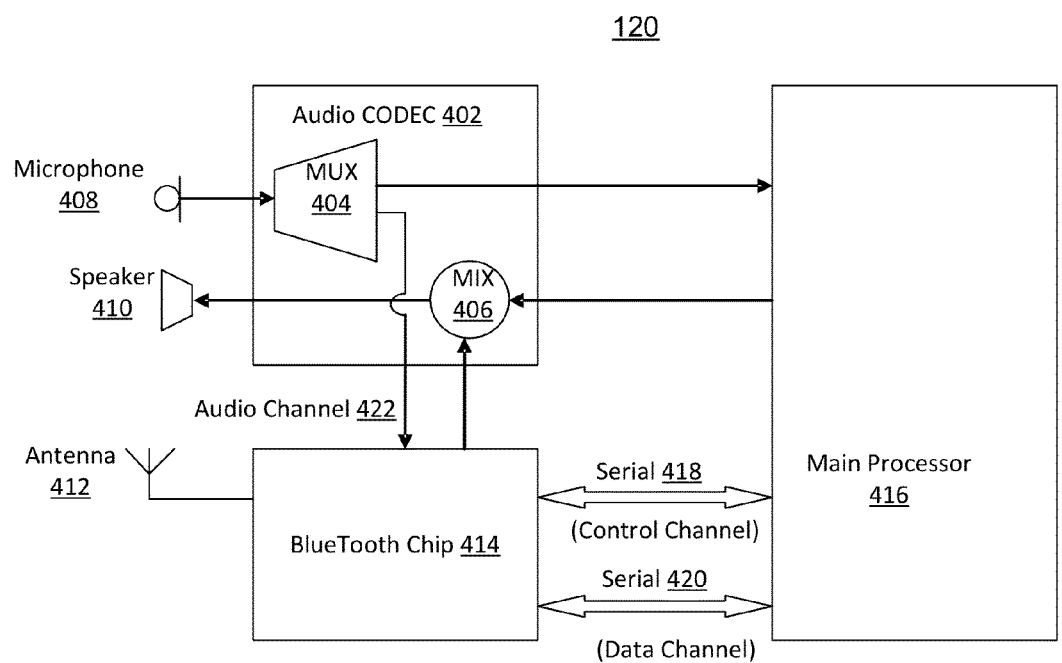
FIG. 4 illustrates a block diagram of an exemplary mobile terminal consistent with the disclosed embodiments.

Returning to FIG. 1, mobile terminal 120 may include any out-of-shelf or customized cell phone, smart phone, tablet, notebook, or any type of portable computing devices with cellular or other wireless capabilities. FIG. 4 shows a block diagram of an exemplary mobile terminal 120.

As shown in FIG. 4, mobile terminal 120 may include an audio coder and decoder (CODEC) 402, which may also include a mix 406 and a multiplexer (MUX) 404. A microphone 408 and a speaker 410 are coupled to audio CODEC 402. Mobile terminal 120 also includes a Bluetooth chip 414 and a main processor 416. An antenna 412 may be coupled to Bluetooth chip 414 for providing RF functions, and audio CODEC 402 is coupled to Bluetooth chip to provide audio channel 422. Audio CODEC 402 is also coupled to main processor 416.

Audio CODEC 402 may be coupled to main processor 416 and/or Bluetooth chip 414 via various types of interfaces, such as analog, PCM, I2S (inter-IC sound), PDM. Further, main processor 416 and Bluetooth chip 414 are coupled through serial interfaces 418 and 420. More particularly, serial interface 418 may be a control channel and serial interface 420 may be a data channel. Serial interface 418 and serial interface 420 may also be logical interfaces of a single or multiple physical serial interfaces, such as UART, SPI, or USB interface. Other arrangements may also be used.

Main processor 416 may provide control and data functions for mobile terminal 120. Main processor 416 may include any appropriate processor, such as processor 302 of computing system 300. Microphone 408 may include one or more appropriate type of microphones and may receive voice signals from a user of mobile terminal 120 and may send the voice signals to audio CODEC 402 for processing, and the processed voice data may be provided to Bluetooth chip 414 or main processor 416 depending on different types of applications. Similarly, audio CODEC 402 may also receive voice data from Bluetooth chip 414 and main processor 416 and to convert the received voice data into voice signals for speaker 410. Speaker 410 may include one or more appropriate type of speakers and may receive voice signals from audio CODEC 402 to generate audio.

Further, Bluetooth chip 414 or similar wireless unit may provide any appropriate functions of a Bluetooth communication module to handle short-range wireless communication between voice relay 110 and mobile terminal 120, including host control interface (HCI) functionalities. Main processor 416 may control Bluetooth chip 414 through serial interface 418 based on certain protocols. Software programs may be executed by main processor 416 and/or Bluetooth chip 414 to implement functions of mobile terminal 120 to ensure voice communication can be achieved on mobile terminal 120 through voice relay 110. Further, mobile terminal 120 may also include a cellular interface for communications using cellular networks, such as WCDMA, CDMA, GSM, WiMAX, and LTE, etc. (not shown).

Figure 5:
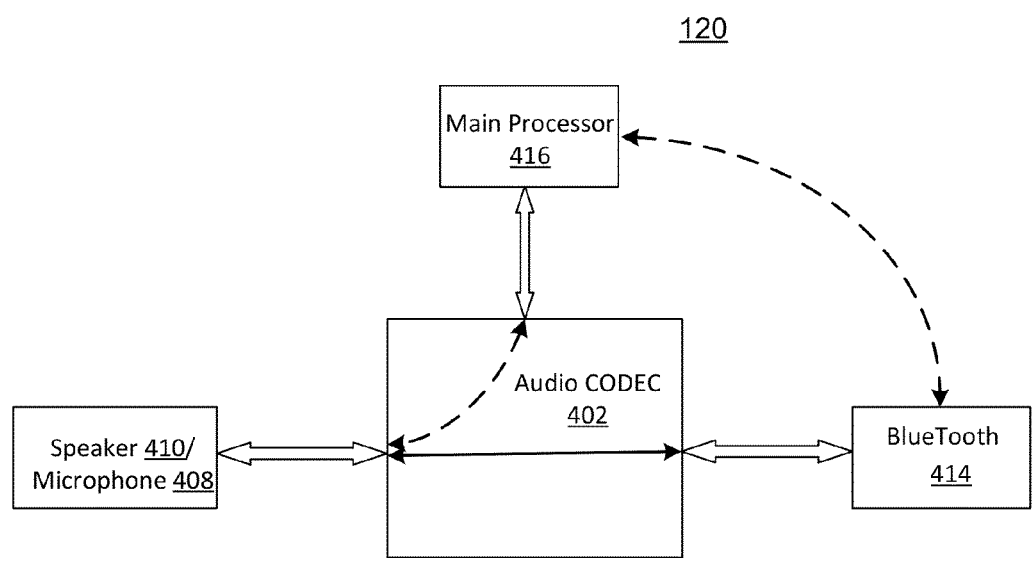
FIG. 5 illustrates exemplary voice or audio paths inside a mobile terminal consistent with the disclosed embodiments.

FIG. 5 illustrates exemplary voice or audio paths inside mobile terminal 120 consistent with the disclosed embodiments. As shown in FIG. 5, a voice/audio path may be established directly between Bluetooth chip 414 and speaker 410 and/or microphone 408, via audio CODEC 402 (as shown in double-arrowed solid line inside audio CODEC 402). That is, audio CODEC 402 supports voice signal format(s) from Bluetooth chip 414 directly. Speaker 410 and microphone 408 may also be referred to as an audio unit.

Alternatively, a voice/audio path may be established between Bluetooth chip 414 and speaker 410 and/or microphone 408, via main processor 416 and audio CODEC 402 (as shown in double-arrowed dotted lines). In this arrangement, voice data to and from Bluetooth chip 414 is relayed by main processor 416 from and to audio CODEC 402. In this arrangement, a direct voice/audio path between Bluetooth chip 414 and audio CODEC 402 may be either unavailable or unnecessary. Although not shown, mobile terminal 120 may also include audio/voice paths for communications using cellular networks.

Figure 6:
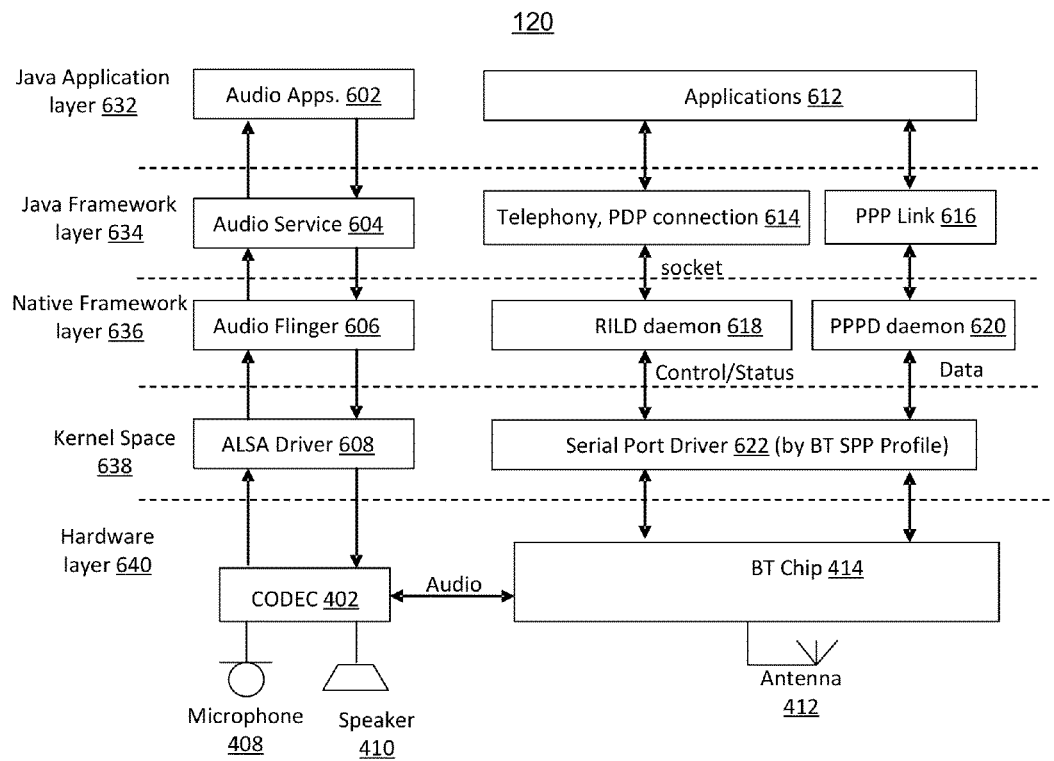
FIG. 6 illustrates an exemplary framework diagram of a mobile terminal consistent with the disclosed embodiments.

FIG. 6 illustrates an exemplary framework diagram of mobile terminal 120 consistent with the disclosed embodiments. As shown in FIG. 6, mobile terminal 120 may be implemented via hardware and software that separated into different functional layers. For example, the hardware and software of mobile terminal 120 may include a Java application layer 632, a Java framework layer 634, a native framework layer 636, a kernel space 638, and a hardware layer 640.

Hardware layer 640 may include actual hardware devices with certain functionalities for mobile terminal 120, such as CODEC 402, microphone 408, speaker 410, Bluetooth chip 414, and antenna 412, etc. Other devices may also be included. Further, Bluetooth chip 414 may be coupled to CODEC 402 via certain audio interface directly or indirectly.

Kernel space 638 may include any appropriate operating system (OS) components, such as advanced Linux sound architecture (ALSA) driver, serial port driver, etc. Any OS may be used, such as Linux, Android, Windows, etc. Further, native framework layer 636 may include any appropriate OS specific software framework running on the OS, such as an audio flinger 606, and a radio interface layer daemon (RILD) 618, a point-to-point protocol (PPP) daemon 620.

Java framework layer 634 may include any appropriate Java software environment for mobile terminal 120 running over native framework layer 636, such as audio service 604, telephony and packet data protocol (PDP) 614, PPP link 616. Further, Java application layer 632 may include any appropriate applications for mobile terminal 120, such as audio applications 602, and applications 612 providing telephonic and other communication related functionalities.

Further, different layers of the framework of mobile terminal 120 may collaborate to complete one or more particular tasks. For example, audio applications 602 may be provided to a user of mobile terminal 120 with certain audio functionalities, such as audio playback or voice communication. Audio applications 602 may provide those audio functionalities through audio service 604, which in turn uses audio flinger 606, ALSA driver 608, and CODEC 402 to carry out those functionalities.

Also for example, applications 612 may be provided to the user for certain voice and/or data functionalities, such as making phone call or text messaging. Applications 612 may provide those functionalities using telephony and PDP connection 614, PPP link 616, RILD daemon 618, and PPPD Daemon 620, serial port driver 622, Bluetooth chip 414, and antenna 412. Telephony and PDP connection 614 and RILD daemon 618 may be used for voice applications, and PPP link 616 and PPPD Daemon 620 may be used for data applications. Applications 612 may also use audio applications 602 and other related layers.

More particularly, mobile terminal 120 may use certain Bluetooth profiles to provide services. For example, mobile terminal 120 may use a serial port profile (SPP) to provide various services, such as a data service. The SPP services may create one or more virtual serial devices connected to voice relay 110 to establish data communication. For another example, mobile terminal 120 may also use a headset profile (HSP) to provide a variety of services, such as voice services (not shown).

For example, RILD 618 may receive control data from other layers and may use the one or more virtual serial devices to forward the control data to voice relay 110. RILD 618 may use standard modem commands, such as AT commands, to set up and/or perform voice communication via voice relay 110. Standard modem commands may include any appropriate commonly used command sets or standardized modem command sets. In certain embodiments, RILD 618 may receive various requests, such as requests for a telephone call, a text message, or a PDP connection, from an upper layer. After receiving such request, RILD 618 may translate the request into an AT command recognizable by other communication components, such as telephone module 202. At the same time, RILD 618 may establish a synchronous connection oriented (SCO) channel, an extended synchronous connection oriented (eSCO) channel, or other channels to send voice signals to voice relay 110. PPPD 620 may perform similar functions to RILD 618 to provide control and/or data services.

In a reverse direction, voice relay 110 may receive control data corresponding to voice data from the SCO channel, eSCO channel, or other channels, and may forward the control data to mobile terminal 120 through the one or more virtual serial devices. RILD 618 may receive the forwarded control data from the one or more virtual serial devices, and may further send the received control data to corresponding layers or applications. In certain embodiments, RILD 618 may receive AT commands corresponding to the telephone call, text message, or PDP connection. At the same time, RILD 618 may establish the SCO channel, eSCO channel, or other channels to receive voice data from voice relay 110. PPPD 620 may perform similar functions to RILD 618 to provide control and/or data services.

Figure 7:
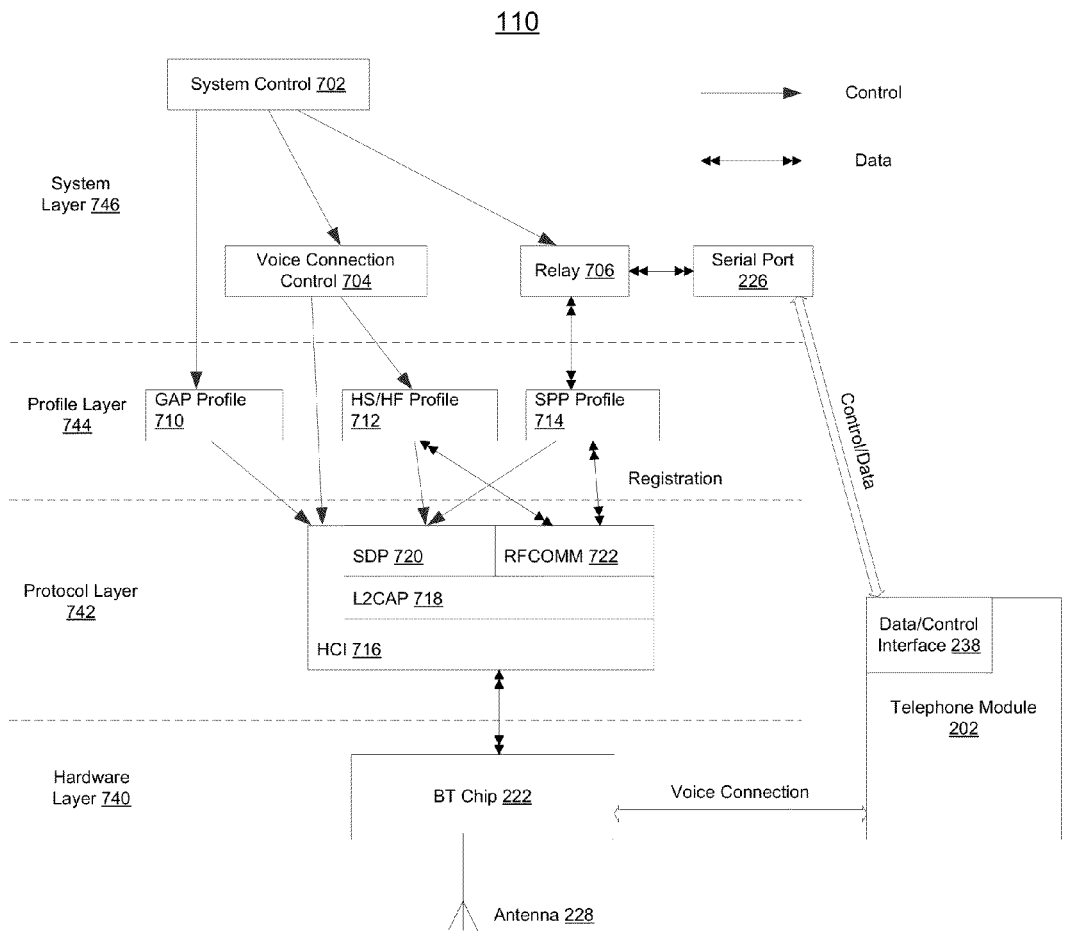
FIG. 7 illustrates an exemplary framework diagram of a voice relay consistent with the disclosed embodiments.

FIG. 7 illustrates an exemplary framework diagram of voice relay 110 corresponding to mobile terminal 120. As shown in FIG. 7, voice relay 110 may also be implemented via hardware and software that separated into different functional layers. For example, the hardware and software of voice relay 110 may include a hardware layer 740, a protocol layer 742, a profile layer 744, and a system layer 746. These layers are listed for illustrative purposes only, other layers, such as various OS layers and other framework and application layers, may also be included.

Hardware layer 740 may include actual hardware devices with certain functionalities for voice relay 110, such as Bluetooth chip 222, antenna unit 228, and telephone module 202, etc. Other devices may also be included. Further, Bluetooth chip 222 may be in communication with mobile terminal 120, and may also be coupled to telephone module 202 to establish a voice connection for forwarding certain voice data from mobile terminal 120 to core network 102 via telephone module 202, which may include one or more wired or wireless communication links.

Protocol layer 742 may include any appropriate protocol components, such as a host control interface (HCI) protocol 716, a logical link control & adaptation protocol (L2CAP) 718, a service discovery protocol (SDP) 720, and a radio frequency communications (RFCOMM) protocol 722, etc. Other protocols may also be used. Further, profile layer 744 may include a various Bluetooth service profiles provided by voice relay 110, such as a generic access profile (GAP) 710, a headset profile (HSP) and hands-free profile (HFP) or HS/HF profile 712, a serial port profile (SPP) 714, etc. Certain registration processes may be performed between the various profiles and protocols.

Further, system layer 746 may include any appropriate components for providing system-level services to other components or voice relay 110, such as a system control unit 702, a voice connection control unit 704, and a relay 706, etc. System control unit 702 may control other components such as GAP profile 710, voice connection control unit 704, and relay 706 to enable system operation. Voice connection control unit 704 may control components related to voice connections of voice relay 110, and relay 706 may be coupled to serial port 226 to forward data received from Bluetooth chip 222 to telephone module 202, without further interpretation or translation. That is, relay 706 implements a transparent mode of voice relay 110 for forwarding received control/voice data without interpretation. On the reverse direction, relay 706 may forward data received from telephone module 202 via serial port 226 to Bluetooth chip 222. Serial port 226 (e.g., a serial port from interface 226) may include any appropriate serial port and may be coupled to data/control interface 238 (e.g., UART interface 238) of telephone module 202.

Figure 8:
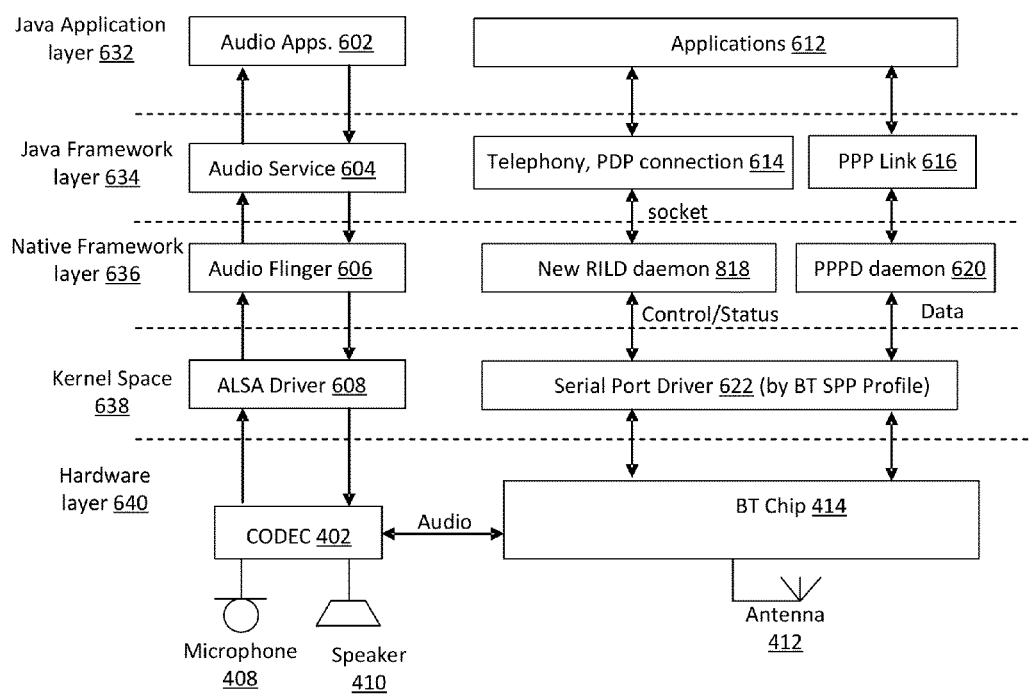
FIG. 8 illustrates another exemplary framework diagram of a mobile terminal consistent with the disclosed embodiments.

FIG. 8 illustrates another exemplary framework diagram of mobile terminal 120 consistent with the disclosed embodiments. As shown in FIG. 8, mobile terminal 120 may be implemented similar to FIG. 6 using same components. The difference between the implementation in FIG. 8 and the implementation in FIG. 6 is that a new RILD daemon 818 is used in the implementation in FIG. 8.

RILD 818 may use one or more virtual serial devices connected to voice relay 110 to establish data communication. That is, RILD 818 may receive control data from other layers and may use the one or more virtual serial devices to forward the control data to voice relay 110. At the same time, RILD 818 may also establish a SCO channel, an eSCO channel, or other channels for voice communication to voice relay 110. Further, RILD 818 may use a customized or self-defined interface language between mobile terminal 120 and voice relay 110 called abstract telephony protocol (ATP) to carry out the communication. Because the ATP is only shared between mobile terminal 120 and voice relay 110 to set up and/or perform voice communication, other systems (e.g., core network 102) involved in the voice communication do not understand ATP commands and may need translation. Telephone module 202 in voice relay 110 may also be unable to understand ATP commands and may also need translation.

The ATP may include two categories of commands. The first category includes request commands, i.e., various requests from mobile terminal 120, such as a request for dialing or for a PDP connection. The second category includes response commands, i.e., various responses from voice relay 110 in reply to the various requests from mobile terminal 120 and requests from the network side. The network side may refer to devices or software components from PSTN network 104 or core network 102. Further, the various responses from voice relay 110 in reply to the various requests from mobile terminal 120 may be called normal response (NR); and the requests from the network side may be called unsolicited response (UR). Other categories may also be used.

An ATP command may contain a series of ASCII characters starting with, for example, "ATP." FIG. 9 illustrates exemplary ATP commands for ATP requests (APTQ). As shown in FIG. 9, ATPQ commands include various sub-types of commands, such as SIM card commands, Call commands, SMS commands, Registration commands, other commands, and Extension commands. Other types of commands may also be included.

Each sub-type commands may include a series of concrete ATP commands. For example, an ATPQ_CAL sub-type may include ATP commands such as call initiating request (ATPQ_CAL_DIAL), hang-up request (ATPQ_CAL_HANG), call waiting request (ATPQ_CAL_WAIT), call holding request (ATPQ_CAL_SWITH_WAIT), call forwarding request (ATPQ_CAL_FORWARD), call muting request (ATPQ_CAL_MUTE), and call history request (ATPQ_CAL_LAST). Other commands may also be included.

Further, an ATP command may also contain one or more parameters, separated with a separator (e.g., "#") from the command part. For example, a call initiating request may be ATPQ_CAL_DIAL#65478898. Other formats may also be used.

FIG. 10 illustrates exemplary ATP commands for normal ATP responses (APTR). As shown in FIG. 10, ATPR commands also include various sub-types of responses, such as general responses, SIM card responses, Call responses, SMS responses, Registration responses, other responses, and Extension responses. A general response is used to return an execution status corresponding to a request in general. For example, an ATPR_GEN_OK may indicate a request is executed successfully, an ATPR_GEN_FAIL may indicate a request is failed to execute, and may follow certain error codes and error information, such as ATPR_GEN_FAIL#E10223#NO_SIM_CARD; and an ATPR_GEN_ERR may indicate the request could not be interpreted or the request may contain errors. Further, other ATPR sub-types of commands may reply to particular requests and may also contain detailed parameters in response to the particular requests.

FIG. 11 illustrates exemplary ATP commands for unsolicited ATP responses (APTU). As shown in FIG. 11, ATPU commands also include various sub-types of responses, such as SIM card responses, Call responses, SMS responses, Registration responses, other responses, and Extension responses, similar to FIG. 9. However, those responses are from the network side and are not in reply to any requests from mobile terminal 120.

Figure 12:
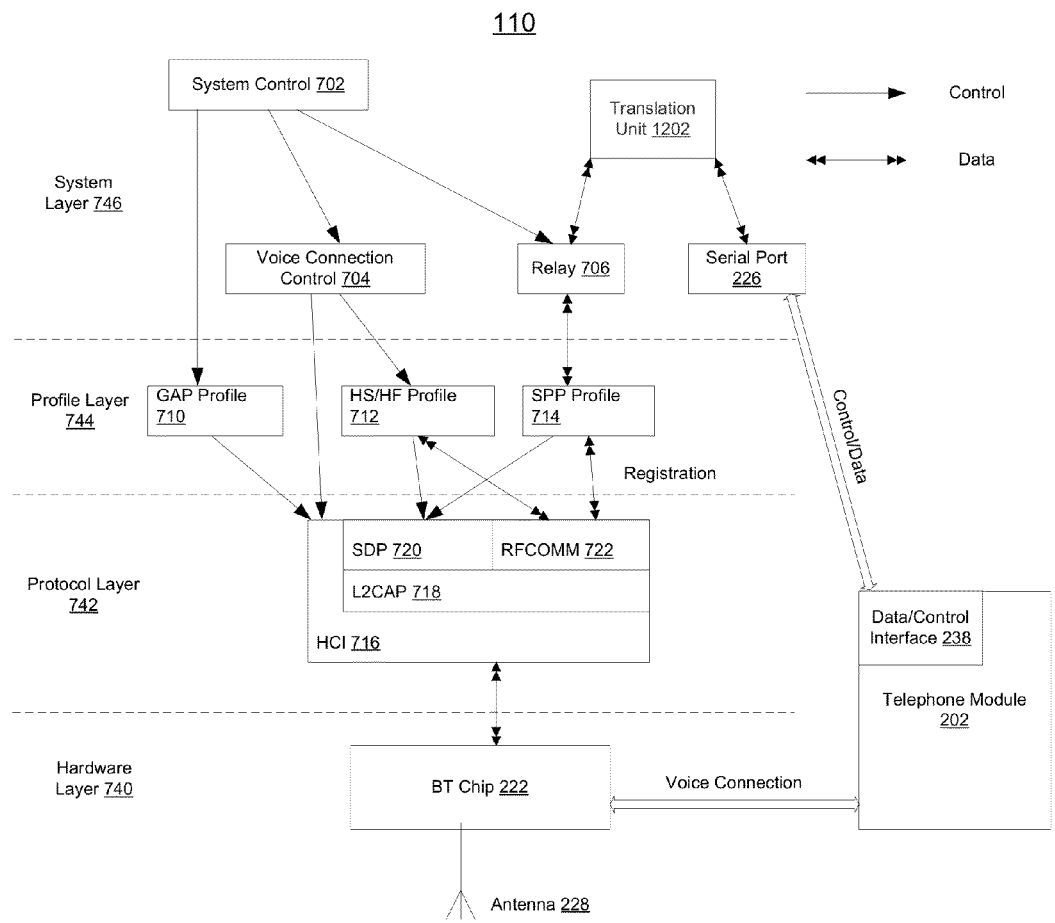
FIG. 12 illustrates another exemplary framework diagram of a voice relay consistent with the disclosed embodiments.

As previously explained, when mobile terminal 120 uses ATP to set up communications, voice delay 110 may translate the ATP commands. FIG. 12 illustrates another exemplary framework diagram of voice relay 110 consistent with the disclosed embodiments. The implementation in FIG. 12 may be similar to the implementation in FIG. 7. However, as shown in FIG. 12, voice relay 110 may include a separate translation unit 1202, different from the implementation in FIG. 7.

Translation unit 1202 may be coupled to relay 706 to receive ATP commands from mobile terminal 120 and may translate the ATP commands into other formats recognizable by telephone module 202 or other devices, such as standard modem commands, from the network side. Translation unit 1202 may also be coupled to serial port 226 to forward the translated commands to telephone module 202.

In the reverse direction, translation unit 1202 may receive commands or responses from telephone module 202 and may translate the received commands or responses into ATP commands and forward the translated ATP commands to mobile terminal 120 through relay 706. That is, voice relay 110 may operate in a translation mode.

Figure 13:
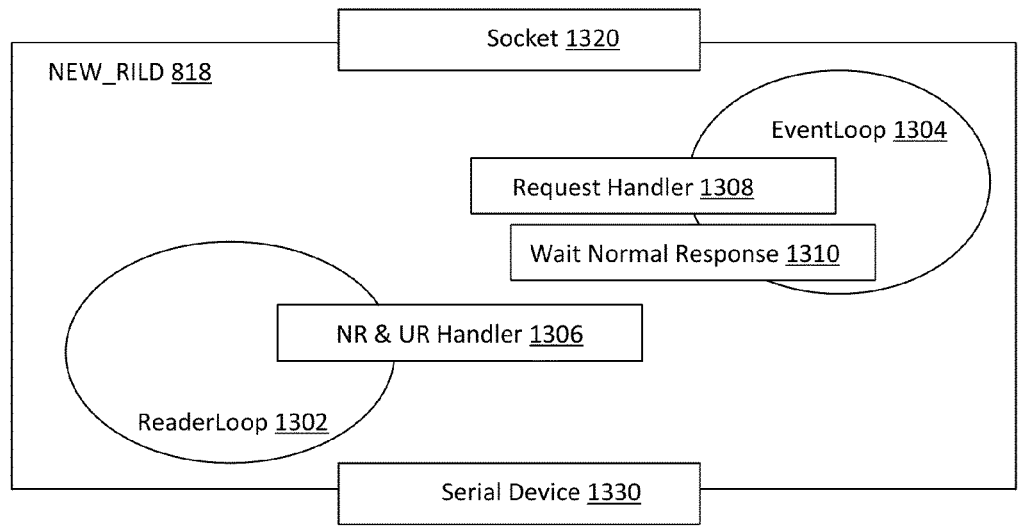
FIG. 13 illustrates an exemplary functional diagram of an RILD for translation mode operation consistent with the disclosed embodiments.

On the other hand, during operation, mobile terminal 120 may be in or aware of a particular operation mode, such as a transparent mode operation or a translation mode operation. FIG. 13 illustrates an exemplary functional diagram of RILD 818 for translation mode operation consistent with the disclosed embodiments.

As shown in FIG. 13, new RILD 818 may include a reader loop 1302, an event loop 1304, a socket 1320, and a serial device 1330. RILD 818 may receive requests from upper layers and forward responses to the upper layers via socket 1320. Event loop 1304 may include any appropriate software programs to handle interactions with socket 1320. For example, event loop 1304 may include a request handler 1308 to receive various requests from the upper layers, and a wait normal response 1310 to wait to receive responses from voice relay 110.

Further, reader loop 1302 may be coupled to serial device 1330 to receive responses from voice relay 110, such as normal responses (NR) and unsolicited responses (UR). Reader loop 1302 may include an NR&UR handler 1306 to handle receiving normal responses from voice relay 110 and unsolicited responses from the network side.

Figure 14:
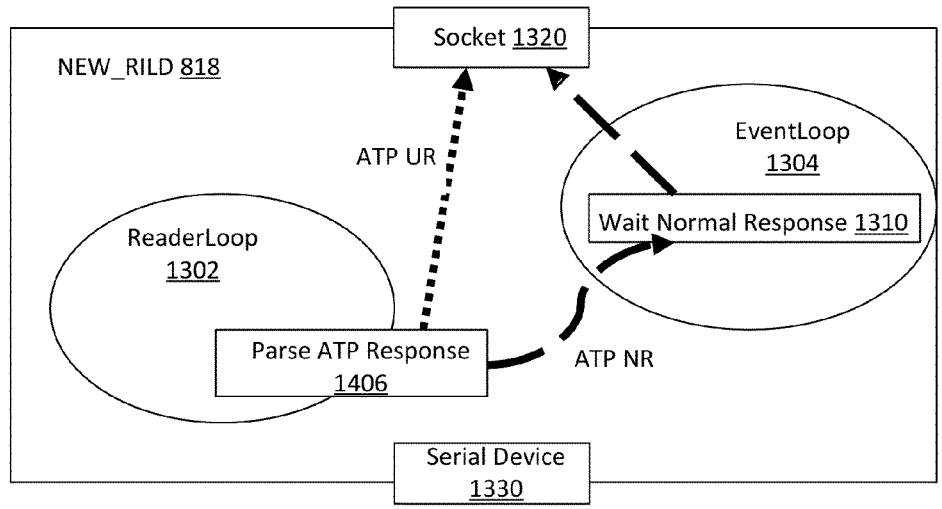
FIG. 14 illustrates another exemplary functional diagram of an RILD for translation mode operation consistent with the disclosed embodiments.

More particularly, as shown in FIG. 14, NR & UR handler 1306 may include a parse ATP response 1406 to interpret received responses. If the received response is an ATP UR, NR & UR handler 1306 or parse ATP response 1406 may forward the received ATP UR directly to the upper layers through socket 1320 (after the translation, if necessary). On the other hand, if the received response is an ATP NR, NR & UR handler 1306 or parse ATP response 1406 may forward the received ATP NR to event loop 1304, and then wait normal response 1310 to process the ATP NR. The processed ATP NR may be forwarded to the upper layers by event loop 1304 via socket 1320.

Figure 15:
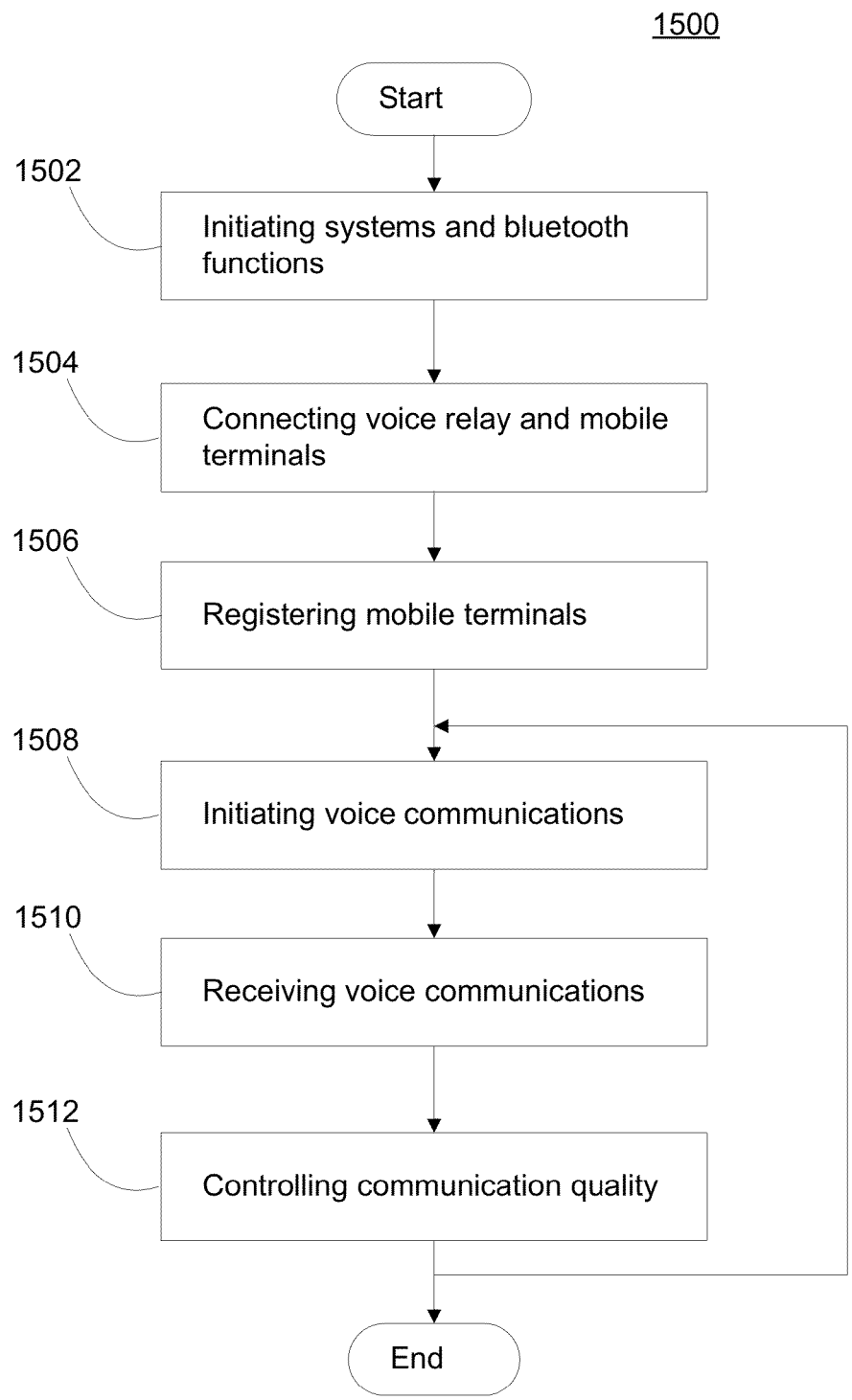
FIG. 15 illustrates an exemplary operation process consistent with the disclosed embodiments.

Returning to FIG. 1, whether using ATP or AT commands, mobile terminal 120 is coupled to voice relay 110 to support remote man-machine interfaces on mobile terminal 120. Further, voice relay 110 and mobile terminal 120 may interact with each other during operation to perform certain communication functions. FIG. 15 shows an exemplary operation process 1500 performed by voice relay 110 and mobile terminal 120 to carry out voice communications.

As shown in FIG. 15, at the beginning, voice relay 110 and/or mobile terminal 120 may start and initiate system settings including Bluetooth functions (1502). For example, voice relay 110 may be configured with identities of mobile terminals that are allowed to be connected to voice relay 110. Such configuration may include certain information of mobile terminals, such as Bluetooth device number, Bluetooth terminal number at a management gateway, service access code (the prefix of the number registered with the network side for dual-mode traffic switching), default pairing password (for example, 1234), and Bluetooth terminal login status, etc. Other information and configurations may also be included.

Figure 16:
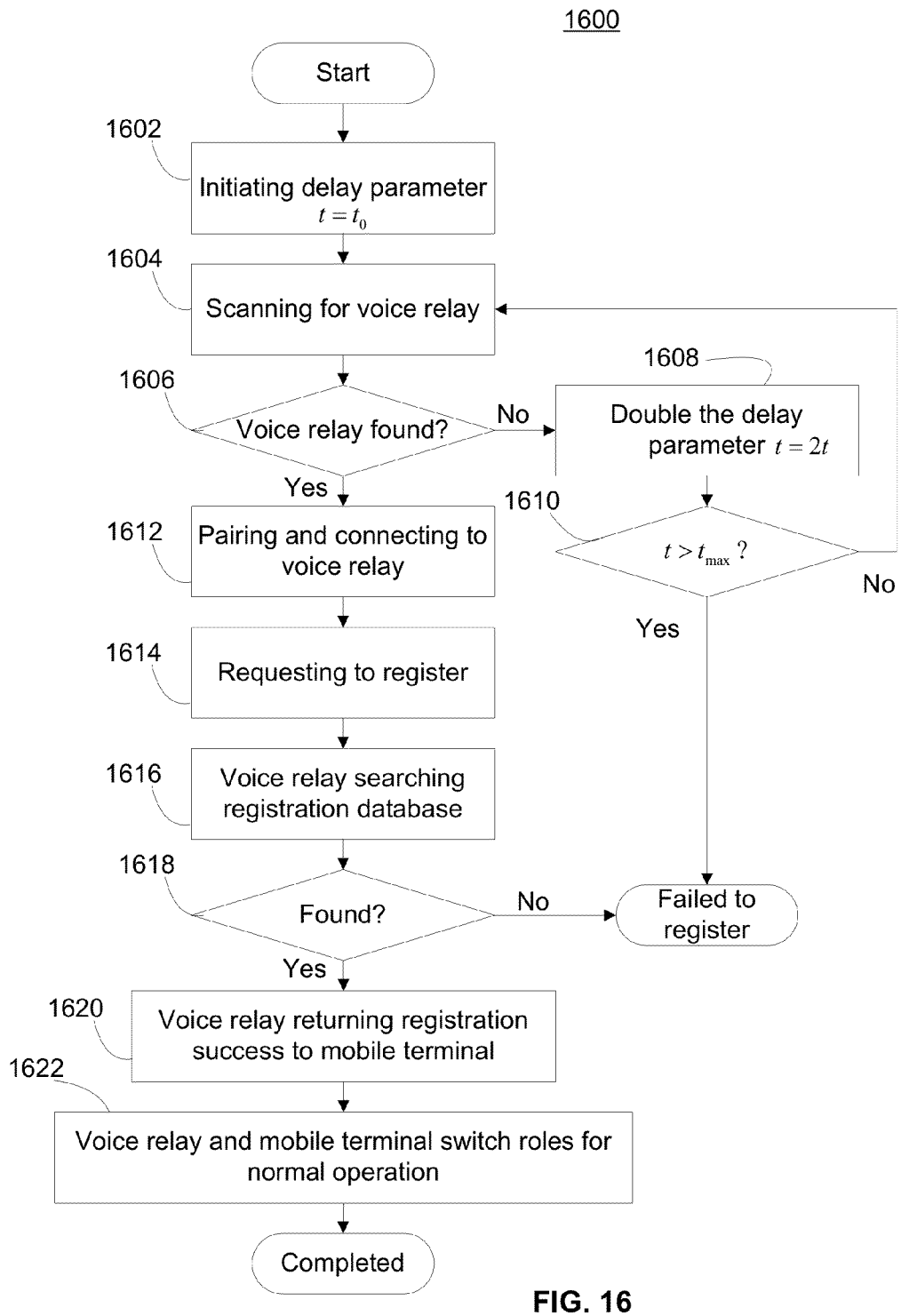
FIG. 16 illustrates an exemplary connection process consistent with the disclosed embodiments.

Such configuration information may be stored in a database of voice relay 110 for operation. Further, voice relay 110 may enable Bluetooth and may set Bluetooth visible or may set Bluetooth visible as a default configuration. Mobile terminal 120 may also enable Bluetooth and set Bluetooth visible or may set Bluetooth visible as a default configuration. After mobile terminal 120 is enabled, mobile terminal 120 and voice relay 110 may establish a Bluetooth connection (1504) and voice relay 110 may register mobile terminal 120 for access (1506). FIG. 16 shows an exemplary connection process 1600 consistent with disclosed embodiments.

As shown in FIG. 16, at the beginning, mobile terminal 120 may initiate a delay parameter t to a particular value $t_0$ (1602). The value $t_0$ may be pre-configured or may be determined during run-time. Mobile terminal 120 may then perform a Bluetooth scan to discover voice relay 110 (1604) and determine whether voice relay 110 is found (1606).

If mobile terminal 120 determines that voice relay 110 is not found (1606, No), mobile terminal 120 may double the value of delay parameter t (1608). Further, mobile terminal 120 may determine whether the value of delay parameter t is greater than a predetermined maximum delay parameter value $t_{max}$ (1610). If mobile terminal 120 determines that the value of delay parameter t is greater than $t_{max}$ (1610, Yes), mobile terminal 120 may decide that the registration is failed and the connection process is terminated. If mobile terminal 120 determines that the value of delay parameter t is not greater than $t_{max}$ (1610, No), mobile terminal 120 may delay for the amount of time determined by the value of delay parameter t and go back to 1604 to scan voice relay 110 again.

Figure 17:
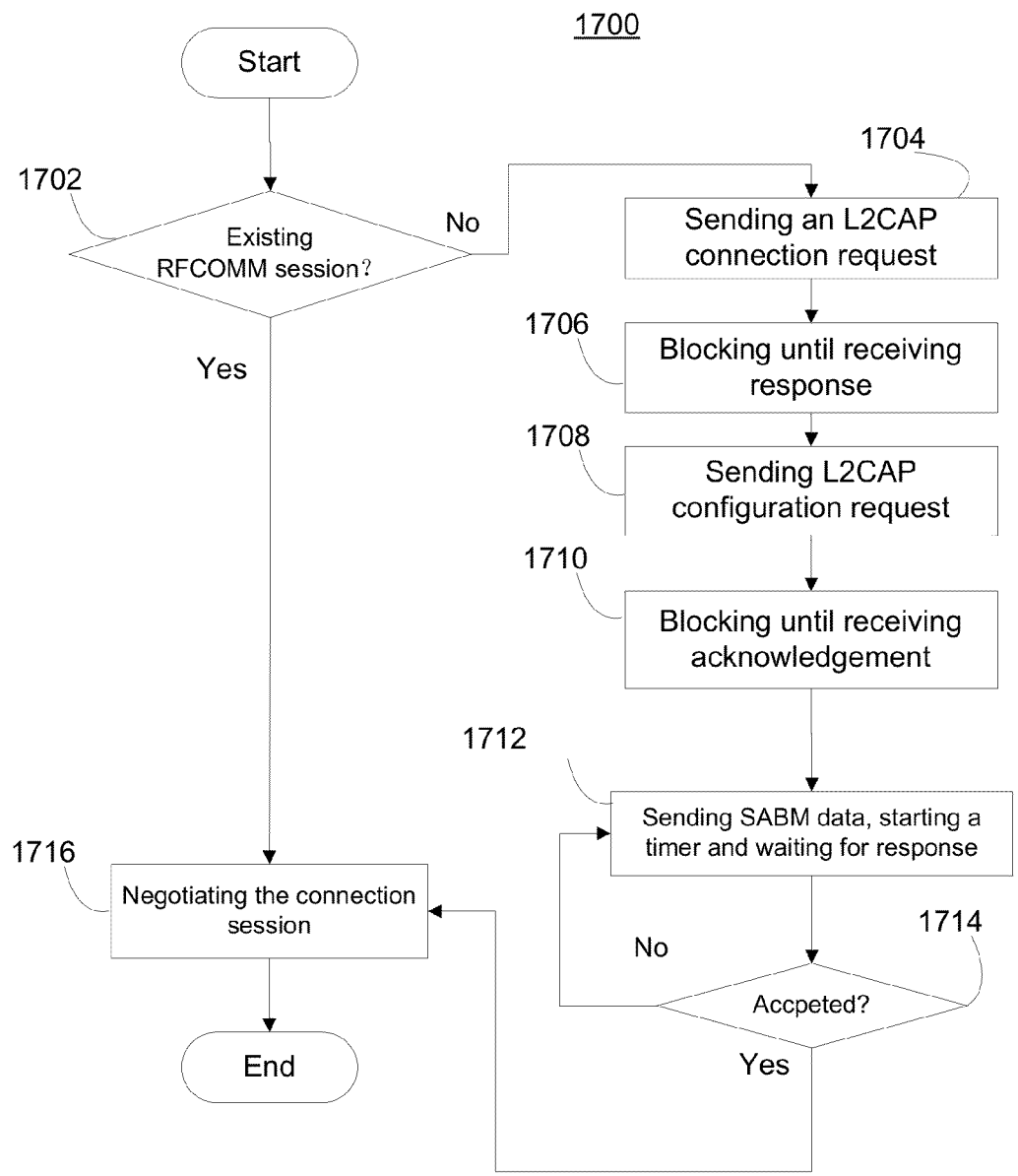
FIG. 17 illustrates an exemplary pairing process consistent with the disclosed embodiments.

On the other hand, if mobile terminal 120 determines that voice relay 110 is found (1606, Yes), mobile terminal 120 may pair with and connect to voice relay 110 (1612). Mobile terminal 120 and voice relay 110 may interact with each other in certain ways to pair with each other and to connect with each other. FIG. 17 shows an exemplary pairing process 1700 consistent with the disclosed embodiments.

As shown in FIG. 17, mobile terminal 120 may determine whether an RFCOMM session already exists between mobile terminal 120 and voice relay 110 (1702). If an RFCOMM session does not exist (1702, No), mobile terminal 120 may send an L2CAP connect request to voice relay 110 (1704) and block until receiving a response from voice relay 110 (1706). After receiving the response from voice relay 110, mobile terminal 120 may send an L2CAP configuration request to voice relay 110 (1708) and block until receiving an acknowledgement from voice relay 110 (1710). After receiving the acknowledgement, mobile terminal 120 may go to 1712. Further, mobile terminal 120 may send a stat asynchronous balanced mode (SABM) frame, a kind of unnumbered frame that is used to set up a logical link between a primary and a secondary station and to inform the secondary station of the mode of operation to be used, to voice relay 110 to request an RFCOMM connection (1712). Mobile terminal 120 may also start a timer and wait for response from voice relay 110 (1712). Thus, the RFCOMM connection is established, mobile terminal 120 may go to 1716 for channel negotiation.

On the other hand, if an RFCOMM session already exists (1702, Yes), mobile terminal 120 may go to 1716 for channel negotiation. Further, mobile terminal 120 may determine whether voice relay 110 accepts the RFCOMM connection (1714). If mobile terminal 120 determines voice relay 110 does not accept the RFCOMM connection (1714, No), mobile terminal 120 may go back to 1712 and send the SABM frame again.

On the other hand, mobile terminal 120 may determine voice relay 110 accepts the RFCOMM connection when, for example, voice relay 110 sends back a unnumbered acknowledgement (UA) frame to mobile terminal 120 to acknowledge the RFCOMM connection and may enter an asynchronous balanced mode (ABM) state for the RFCOMM connection (1714, Yes).

Figure 18:
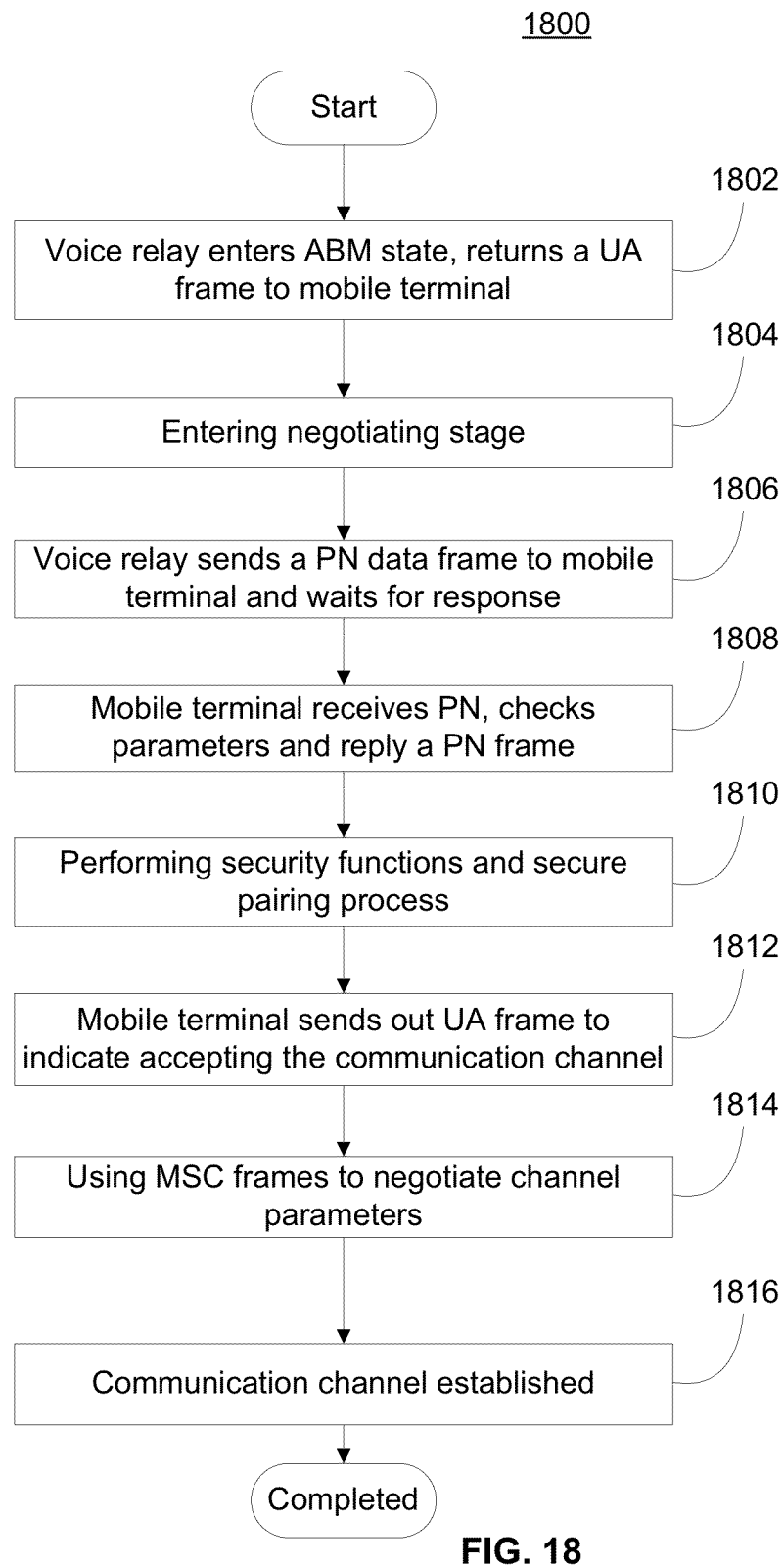
FIG. 18 illustrates an exemplary negotiating process between a mobile terminal and a voice relay consistent with the disclosed embodiments.

That is, if mobile terminal 120 determines voice relay 110 accepts the RFCOMM connection (1714, Yes), mobile terminal 120 and voice relay 110 may further negotiate the connection session (1716). FIG. 18 shows an exemplary negotiating process 1800 between mobile terminal 120 and voice relay 110.

As shown in FIG. 18, at the beginning, voice relay 110 may enter the ABM state and return the UA frame to mobile terminal 120 to acknowledge connection (1802). Further, mobile terminal 120 and voice relay 110 enter negotiating stage (1804). Voice relay 110 may send a parameter negotiation (PN) frame to mobile terminal 120 and wait for a response from mobile terminal 120 (1806).

Mobile terminal 120 receives the PN frame from voice relay 110, checks the parameters in the PN frame, and sends back a new PN frame to respond to voice relay 110 (1808). Optionally, mobile terminal 120 and voice relay 110 may perform a secure pairing process to ensure security of the connection establishment between mobile terminal 120 and voice relay 110 (1810). For example, mobile terminal 120 and voice relay 110 may use a secure simple pairing (SSP) mechanism to perform a secure pairing process, and may also use the stored pairing password during the secure pairing process. Other pairing mechanisms may also be used.

After the secure pairing, mobile terminal 120 may send out a UA frame to indicate accepting a communication channel between mobile terminal 120 and voice relay 110 (1812). Further, mobile terminal 120 and voice relay 110 may negotiate communication channel parameters using modem status command (MSC) frames (1814). Any appropriate channel parameters may be negotiated. After the channel parameter negotiation, the communication channel between mobile terminal 120 and voice relay 110 is established and ready for use (1816).

If under certain circumstances, such as a time out event or other events, either mobile terminal 120 or voice relay 110 may decide to disconnect the connection between mobile terminal 120 and voice relay 110, mobile terminal 120 or voice relay 110 may send a disconnected (DISC) frame to voice relay 110 or mobile terminal 120, respectively. After receiving the DISC frame, mobile terminal 120 or voice relay 110 may terminate the established connection and release related resources. If all data-link-connection-identifier (DLCI) data connections are disconnected, mobile terminal 120 or voice relay 110 may disconnect any control channel between each other and may also disconnect the L2CAP connection between mobile terminal 120 and voice relay 110.

Returning to FIG. 17, after negotiating the connection session (1716), the pairing process 1700 is completed.

Returning to FIG. 16, after mobile terminal 120 pairs with and connects to voice relay 110 (1612), mobile terminal 120 may request to register with voice relay 110 (1614). After receiving the registration request from mobile terminal 120, voice relay 110 may search a registration database (1616) to determine whether a requesting mobile terminal 120 is on a registration list (1618). The registration database may include registration information of a plurality of mobile terminals that are allowed to be registered with voice relay 110.

If voice relay 110 does not find the requesting mobile terminal 120 on the registration list (1618, No), voice relay 110 may decide that the registration is failed and the connection process is terminated. On the other hand, if voice relay 110 finds the requesting mobile terminal 120 on the registration list (1618, Yes), voice relay 110 may return a registration success indication to the requesting mobile terminal 120 (1620). Further, voice relay 110 and mobile terminal 120 may switch roles for normal operation (1622). That is, if voice relay 110 is not a master device for Bluetooth communication while mobile terminal 120 is a master device, mobile terminal 120 may switch role with voice relay 110 such that voice relay 110 is the master device for Bluetooth communication, which may be the case during normal operation.

Figure 19:
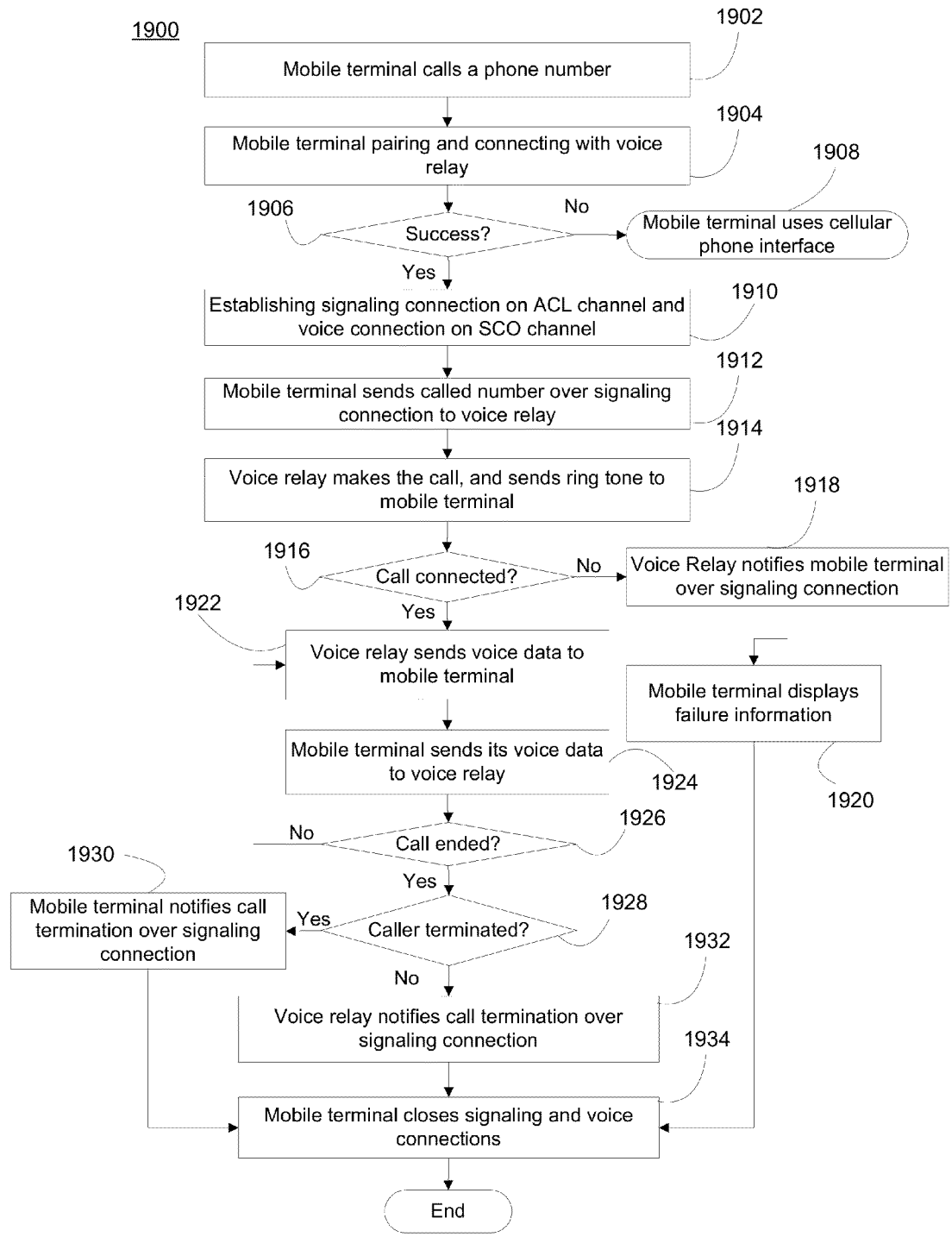
FIG. 19 illustrates an exemplary outgoing call process consistent with the disclosed embodiments.

Returning to FIG. 15, after mobile terminal 120 and voice relay 110 established a Bluetooth connection (1504) and voice relay 110 registers mobile terminal 120 for access (1506), mobile terminal 120 may initiate a voice communication with an external device from the network side (1508). FIG. 19 shows an exemplary outgoing call process 1900 consistent with the disclosed embodiments.

As shown in FIG. 19, at the beginning, mobile terminal 120 decides to initiate an outgoing call to a particular phone number (1902). For example, a user of mobile terminal 120 may use a graphic user interface (GUI), such as a phone key pad interface or similar GUIs, to make a call by entering the phone number to be called. After the user made the call, mobile terminal 120 may indicate to the user that the call is being made. Further, mobile terminal 120 may try to connect with voice relay 110, as previously explained (1904).

Mobile terminal 120 may further determine whether the connection to voice relay 110 is a success (1906). If mobile terminal 120 determines that the connection to voice relay 110 is not a success (1906, No), mobile terminal 120 may use a cellular phone interface, such as a WCDMA, CDMA, GSM, WiMAX, or LTE interface to make the outgoing call (1908).

On the other hand, if mobile terminal 120 determines that the connection to voice relay 110 is a success (1906, Yes), mobile terminal 120 may establish a signaling connection on an asynchronous connection-oriented logical (ACL) transport channel, and a voice connection on a synchronous connection oriented (SCO) channel (1910). Other configurations may also be used.

Further, mobile terminal 120 may send called number and other call-related information to voice relay 110 over the established signaling connection (1912). As previously explained, mobile terminal 120 may also support a transparent mode and a translation mode and may use AT commands or ATP commands depending on an operation mode of voice relay 110. For example, mobile terminal 120 may use AT commands if voice relay 110 is in a transparent mode, or may use ATP commands if voice relay 110 is in a translation mode.

Voice relay 110 may make the outgoing call using telephone module 202 and may also send a ring tone to mobile terminal 120 (1914). Voice relay 110 may also determine whether the call is connected (1916). If voice relay 110 determines that the call is not connected (1916, No), voice relay 110 may notify mobile terminal 120 of the failure over the signaling connection (1918). Voice relay 110 may also send failure causes, such as busy or not turned on, etc. Mobile terminal 120 may display the call failure along with failure causes to the user on the GUI (1920). Further, mobile terminal 120 may close both signaling connection and voice connection (1934).

On the other hand, if voice relay 110 determines that the call is connected (1916, Yes), voice relay 110 may send voice data of the connected call to mobile terminal 120 over the voice connection (1922). Mobile terminal 120 may receive the voice data from voice relay 110 and may also send new voice data related to the call to voice relay 110 to be forwarded to the external phone device (1924).

Further, voice relay 110 may determine whether the call is ended (1926). If the call is not ended (1926, No), voice relay 110 continues sending voice data to mobile terminal 120 (1922). However, if the call is ended (1926, Yes), voice relay 110 and mobile terminal 120 may further determine whether the call is terminated by the caller, i.e., mobile terminal 120 (1928).

If the call is terminated by the caller (1928, Yes), mobile terminal 120 may notify voice relay 110 of the call termination over signaling connection such that voice relay 110 can terminate the call on the network side (1930), and mobile terminal 120 may close both signaling connection and voice connection (1934).

On the other hand, if the call is not terminated by the caller (1928, No), that is, the network side terminated the call, voice relay 110 may notify mobile terminal 120 of the call termination over the signaling connection (1932), and mobile terminal 120 may close both signaling connection and voice connection (1934).

Figure 20:
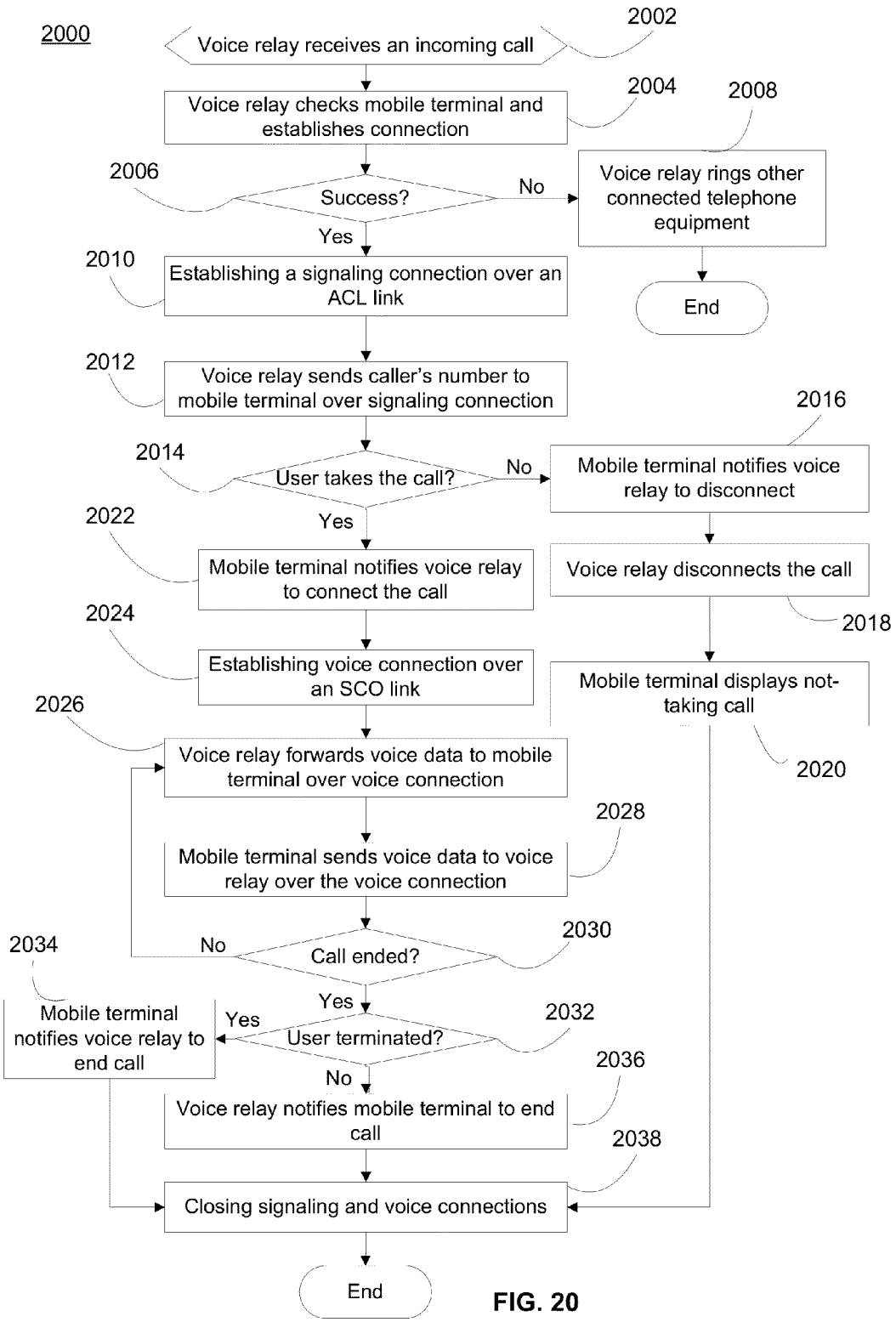
FIG. 20 illustrates an exemplary incoming call process consistent with the disclosed embodiments.

Returning to FIG. 15, during operation, mobile terminal 120 may also receive voice communication corresponding certain calls forwarded to mobile terminal 120 by voice relay 110 (1510). FIG. 20 shows an exemplary incoming call process 2000 consistent with the disclosed embodiments. As shown in FIG. 20, at the beginning, voice relay 110 receives an incoming call via telephone module 202 (2002). After voice relay 110 receives the incoming call, voice relay 110 may check the incoming call and may determine a mobile terminal 120 that is pre-configured to receive the incoming call or is available to receive the incoming call. Voice relay 110 may establish a connection to the mobile terminal 120 (2004).

Further, voice relay 110 may determine whether the connection to the mobile terminal 120 is a success (2006). If voice relay 110 determines that the connection to the mobile terminal 120 is not a success (2006, No), voice relay 110 may ring other connected telephone equipment to indicate the incoming call and/or the unavailability of the mobile terminal 120 (2008) and may complete the incoming process afterwards.

On the other hand, if voice relay 110 determines that the connection to the mobile terminal 120 is a success (2006, Yes), voice relay 110 may establish a signaling connection over an ACL connection (2010) and may send caller's phone number to the mobile terminal 120 over the established signaling connection (2012).

After receiving the caller's information from voice relay 110, the mobile terminal 120 may notify the user about the incoming call on the GUI, and may determine whether the user takes the incoming call (2014). If the user does not take the incoming call (2014, No), the mobile terminal 120 may notify voice relay 110 to disconnect the incoming call (2016). Voice relay 110 may thus disconnect the incoming call (2018) and the mobile terminal 120 may display not-taking call to the user over the GUI (2020). Further, mobile terminal 120 may close both signaling connection and voice connection (2038).

On the other hand, if the user takes the incoming call (2014, Yes), the mobile terminal 120 may notify voice relay 110 to connect the incoming call (2022). Voice relay 110 may further establish a voice connection to the mobile terminal 120 over an SCO connection (2024).

After establishing the voice connection to the mobile terminal 120, voice relay 110 may forward voice data to the mobile terminal 120 over the voice connection (2026). Mobile terminal 120 may receive the voice data from voice relay 110 and may also send new voice data related to the incoming call to voice relay 110 to be forwarded to the external phone device (2028).

Further, voice relay 110 may determine whether the call is ended (2030). If the call is not ended (2030, No), voice relay 110 continues sending voice data to mobile terminal 120 (2026). However, if the call is ended (2030, Yes), voice relay 110 and mobile terminal 120 may further determine whether the call is terminated by the user, i.e., mobile terminal 120 (2032).

If the call is terminated by the user (2032, Yes), mobile terminal 120 may notify voice relay 110 of the call termination over signaling connection such that voice relay 110 can terminate the call on the network side (2034), and mobile terminal 120 may close both signaling connection and voice connection (2038).

On the other hand, if the call is not terminated by the user (2032, No), that is, the network side terminated the call, voice relay 110 may notify mobile terminal 120 of the call termination over the signaling connection and end the call (2036), and mobile terminal 120 may close both signaling connection and voice connection (2038).

Figure 21:
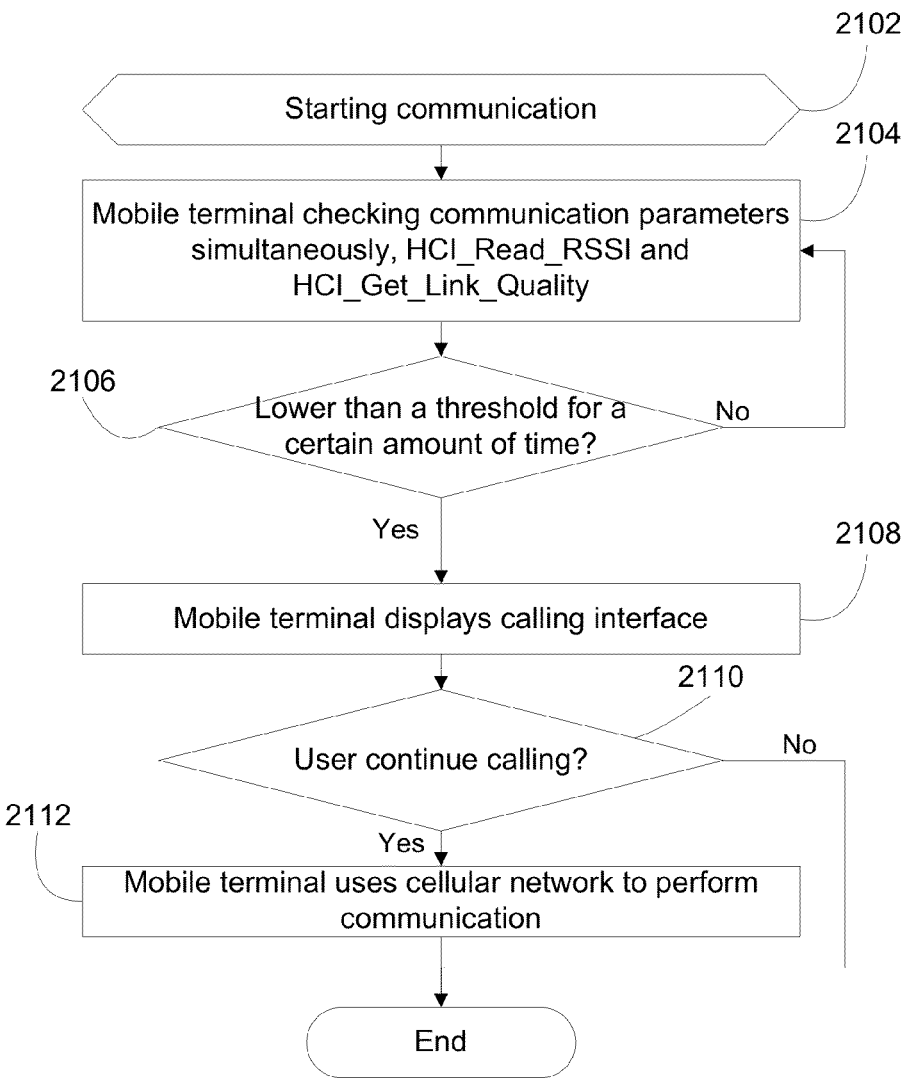
FIG. 21 illustrates an exemplary mobile terminal communication quality controlling process consistent with the disclosed embodiments.

Returning to FIG. 15, during operation, mobile terminal 120 and voice relay 110 may also control communication quality (1512). For example, mobile terminal 120 and voice relay 110 may control communication quality based on certain communication parameters. FIG. 21 shows an exemplary mobile terminal communication quality controlling process 2100 consistent with the disclosed embodiments.

As shown in FIG. 21, at the beginning, mobile terminal 120 starts communication via voice relay 110 (2102). Mobile terminal 120 may check certain communication parameters, such as HCI_Read_RSSI (i.e. a Bluetooth receive signal strength indicator) and HCI_Get_Link_Quality (i.e., a Bluetooth connection quality indicator), simultaneously (2104). Further, mobile terminal 120 may determine whether any or all of the communication parameters are lower than a threshold for a predetermined amount of time (2106).

If mobile terminal 120 determines any or all of the communication parameters are not lower than the threshold for the predetermined amount of time (2106, No), mobile terminal 120 goes back to 2104 to continue checking the communication parameters. On the other hand, if mobile terminal 120 determines any or all of the communication parameters are lower than the threshold for the predetermined amount of time (2106, Yes), mobile terminal 120 may display such information on a calling interface to indicate an undesired communication quality to the user (2108). Further, mobile terminal 120 may determine whether the user continues calling (2110).

If mobile terminal 120 determines that the user does not continue calling (2110, No), mobile terminal 120 may end communication quality controlling process 2100. On the other hand, if mobile terminal 120 determines that the user continues calling (2110, Yes), mobile terminal 120 may use a cellular network to perform communication instead of using voice relay 110 (2112).

Figure 22:
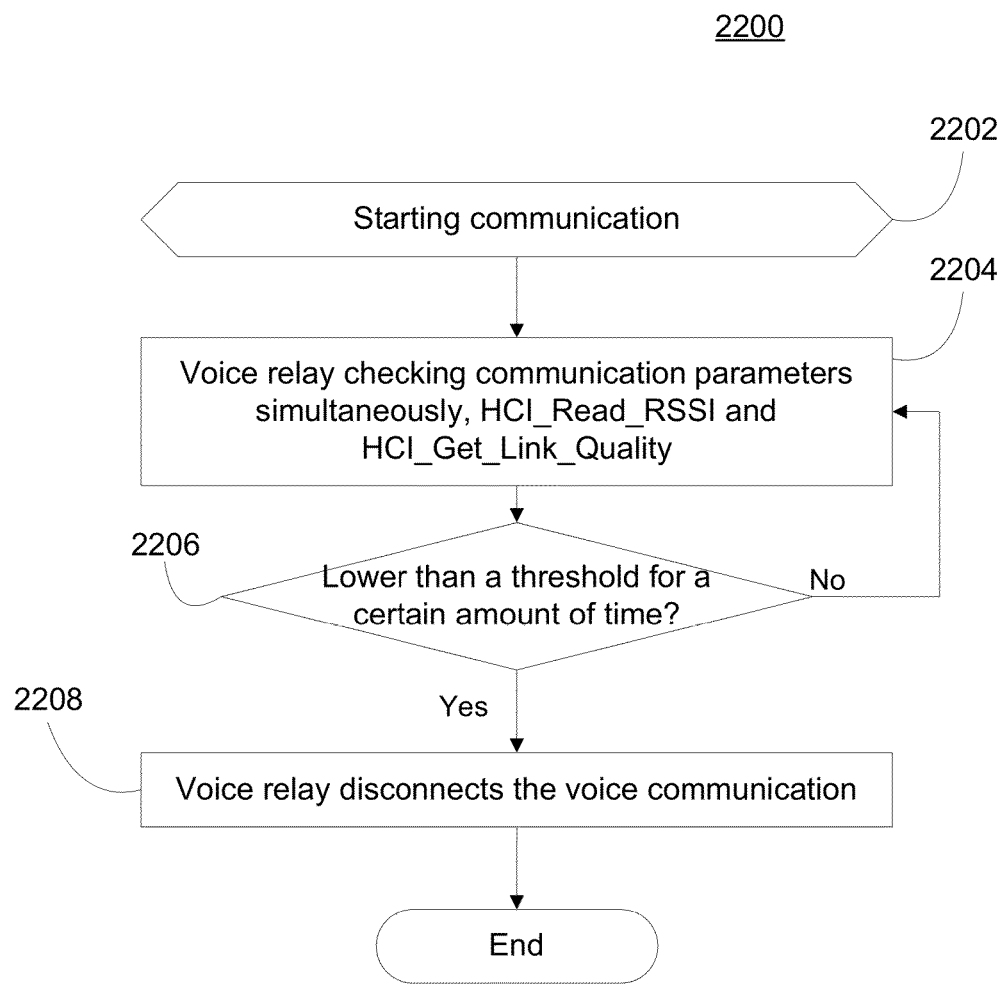
FIG. 22 illustrates an exemplary voice relay communication quality controlling process consistent with the disclosed embodiments.

FIG. 22 shows an exemplary voice relay communication quality controlling process 2200 consistent with the disclosed embodiments. As shown in FIG. 22, at the beginning, voice relay 110 starts communication with mobile terminal 120 (2202). Voice relay 110 may check certain communication parameters, such as HCI_Read_RSSI and HCI_Get_Link_Quality, simultaneously (2204). Further, voice relay 110 may determine whether any or all of the communication parameters are lower than a threshold for a predetermined amount of time (2206).

If voice relay 110 determines any or all of the communication parameters are not lower than the threshold for the predetermined amount of time (2206, No), voice relay 110 goes back to 2204 to continue checking the communication parameters. On the other hand, if voice relay 110 determines any or all of the communication parameters are lower than the threshold for the predetermined amount of time (2206, Yes), voice relay 110 may disconnect the voice communication due to an undesired communication quality (2208).

Returning to FIG. 15, process 1500 may be completed or may be repeated from 1508 to perform voice communications with the external device and also to control communication quality.

The disclosed systems and methods may provide many advantageous applications. For example, by using the disclosed systems and methods a cellular phone user can significantly reduce the level of radiation when in the indoor environment, improve communication quality by using a landline-based voice relay, and reduce cost of cellular phone usages. Other advantages and applications are understood by those skilled in the art.

What is claimed is:

1. A wireless relay apparatus, comprising:
   a telephone module configured to couple with a public switched telephone network (PSTN) to receive a telephone call from an external party; and a wireless module coupled to the telephone module to process the telephone call and configured to wirelessly connect to a mobile terminal such that the telephone call is forwarded to the mobile terminal over a short-range wireless link along with signaling information for the mobile terminal to establish both a signaling connection and a voice connection with the external party, wherein the wireless module is configured to be operable in a transparent mode, under which the wireless module uses standard modem commands supported by the telephone module to exchange control data corresponding to the phone call with the mobile terminal, and a translation mode, under which the wireless module uses abstract telephony protocol (ATP) commands to exchange control data corresponding to the phone call with the mobile terminal and translates the ATP commands into the standard modem commands supported by the telephone module, so as to exchange voice data with the mobile terminal.

2. The wireless relay apparatus according to claim 1, wherein:
The short-range wireless link is a Bluetooth wireless link.

3. The wireless relay apparatus according to claim 2, wherein:
the wireless module includes a registration database to contain registration information of a plurality of pre-configured mobile terminals; and
the wireless module registers the mobile terminal based on the registration database before forwarding the telephone call to the mobile terminal.

4. The wireless relay apparatus according to claim 3, wherein:
the wireless module is configured to perform a Bluetooth pairing and connecting process upon a request from the mobile terminal before registering the mobile terminal.

5. The wireless relay apparatus according to claim 1, wherein:
the wireless module uses standard modem commands supported by the telephone module to exchange control data corresponding to the telephone call with the mobile terminal when operating in the transparent mode.

6. The wireless relay apparatus according to claim 1, wherein:
the ATP commands include at least an ATP request command type, an ATP normal response type, and an ATP unsolicited response type.

7. A mobile wireless terminal, comprising:
a wireless unit configured to connect to a wireless relay over a short-range wireless link for receiving a telephone call forwarded by the wireless relay coupled between the mobile wireless terminal and a public switched telephone network (PSTN), the telephone call being originated from the PSTN;
an audio codec to process voice signals corresponding to the telephone call; and
a processor unit coupled to the wireless unit to process the telephone call such that the telephone call is answered by the mobile wireless terminal,
wherein the processor unit is configured to support a transparent mode, under which the processor unit uses standard modem commands supported by a telephone module in the wireless relay to exchange control data corresponding to the phone call with the mobile wireless terminal, and a translation mode, under which the processor unit uses abstract telephony protocol (ATP) commands to exchange control data corresponding to the phone call with the wireless relay and translates the ATP commands into the standard modem commands supported by the telephone module, so as to exchange voice data with the wireless relay.

8. The mobile wireless terminal according to claim 7, wherein:
the short-range wireless link is a Bluetooth wireless link.

9. The mobile wireless terminal according to claim 8, wherein:
the wireless unit is configured to perform a Bluetooth pairing and connecting process with the wireless relay before sending a registration request to the wireless relay.

10. The mobile wireless terminal according to claim 7, wherein:
the mobile wireless terminal includes an audio unit containing at least a microphone and a speaker; and
at least one of the processor unit and the audio codec relays voice signals corresponding to voice communication between the wireless unit and the audio unit.

11. The mobile wireless terminal according to claim 7, wherein:
the ATP commands include at least an ATP request command type, an ATP normal response type, and an ATP unsolicited response type.

12. The mobile wireless terminal according to claim 11, wherein:
the processor unit is configured to implement separate processing paths to handle an ATP normal response and an ATP unsolicited response, respectively.

13. A method for a wireless communication system including a mobile terminal and a wireless relay to couple between the mobile terminal and a public switched telephone network (PSTN), comprising:
discovering, by the mobile terminal, the wireless relay;
connecting, by the mobile terminal, to the wireless relay after the wireless relay is discovered;
registering, by the wireless relay, the mobile terminal after receiving a register request from the mobile terminal based on a database containing registration information of a plurality of mobile terminals; and
initiating, by the mobile terminal, a telephone call to the PSTN via the wireless relay,
wherein the mobile terminal and the wireless relay exchange voice data corresponding to the telephone call over a short-range wireless link operable in a transparent mode, under which the wireless relay uses standard modem commands to exchange control data corresponding to the phone call with the mobile terminal, and a translation mode, under which the wireless relay uses abstract telephony protocol (ATP) commands to exchange control data corresponding to the phone call with the mobile terminal and the wireless relay translates the ATP commands into standard modem commands.

14. The method according to claim 13, wherein:
the short-range wireless link is a Bluetooth wireless link.

15. The method according to claim 14, wherein connecting further includes:
pairing the mobile terminal and the wireless relay;
negotiating a plurality of communication parameters between the mobile terminal and the wireless relay; and
establishing a communication channel between the mobile terminal and the wireless relay.

16. The method according to claim 14, further including:
switching, by the mobile terminal, from the Bluetooth wireless link to a cellular communication link for the telephone call, when the mobile terminal fails to connect to the wireless relay after the wireless relay is discovered.

17. The method according to claim 14, further including:
checking, by the wireless relay and the mobile terminal, a plurality of communication parameters including at least a radio strength indicator and a link quality of the Bluetooth wireless link;
switching, by the mobile terminal, from the Bluetooth wireless link to a cellular communication link for the telephone call, when the plurality of communication parameters are below a first threshold; and
disconnecting, by the wireless relay, the telephone call when the plurality of communication parameters are below a second threshold.

18. A wireless communication system, comprising:
a wireless relay coupled to a public switched telephone network (PSTN); and
a mobile terminal configured to discover the wireless relay and to initiate a telephone call to the PSTN via the wireless relay,
wherein the mobile terminal is further configured to connect to the wireless relay after the wireless relay is discovered; and
the wireless relay is further configured to register the mobile terminal after receiving a register request from the mobile terminal based on a database containing registration information of a plurality of mobile terminals; and
wherein the mobile terminal and the wireless relay exchange voice data corresponding to the telephone call over a short-range wireless link operable in a transparent mode, under which the wireless relay uses standard modem commands to exchange control data corresponding to the phone call with the mobile terminal, and a translation mode, under which the wireless relay uses abstract telephony protocol (ATP) commands to exchange control data corresponding to the phone call with the mobile terminal and the wireless relay translates the ATP commands into standard modem commands.

19. The wireless communication system according to claim 18, wherein:
the short-range wireless link is a Bluetooth wireless link.

20. The wireless communication system according to claim 19, wherein, to connect to the wireless relay, the mobile terminal is further configured to:
pair with the wireless relay;
negotiate a plurality of communication parameters with the wireless relay; and
establish a communication channel with the wireless relay.

21. The wireless communication system according to claim 20, wherein the mobile terminal is further configured to:
switch from the Bluetooth wireless link to a cellular communication link for the telephone call, when the mobile terminal fails to connect to the wireless relay after the wireless relay is discovered.

22. The wireless communication system according to claim 20, wherein:
the mobile terminal is further configured to check a plurality of communication parameters including at least a radio strength indicator and a link quality of the Bluetooth wireless link, and to switch from the Bluetooth wireless link to a cellular communication link for the telephone call, when the plurality of communication parameters are below a first threshold; and
the wireless relay is further configured to check the plurality of communication parameters, and to disconnect the telephone call when the plurality of communication parameters are below a second threshold.

* * * * *